United States Patent
Kumar et al.

(10) Patent No.: US 11,792,651 B2
(45) Date of Patent: Oct. 17, 2023

(54) AUTHENTICATION-BASED COMMUNICATION LINK WITH A PERIPHERAL DEVICE

(71) Applicant: QUALCOMM Incorporated, San Diego, CA (US)

(72) Inventors: Rajinder Kumar, Hyderabad (IN); Naga Chandan Babu Gudivada, Hyderabad (IN); Prakash Tiwari, Hyderabad (IN); Ravisagar Pyarasani, Hyderabad (IN); Pradeep Cherukoori, Hyderabad (IN); Phani Vemula, Hyderabad (IN); Rajesh Vundavalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 643 days.

(21) Appl. No.: 16/931,769

(22) Filed: Jul. 17, 2020

(65) Prior Publication Data
US 2022/0022030 A1  Jan. 20, 2022

(51) Int. Cl.
| | |
|---|---|
| H04W 12/50 | (2021.01) |
| H04W 12/06 | (2021.01) |
| G06F 13/10 | (2006.01) |
| H04L 9/30 | (2006.01) |
| H04W 12/037 | (2021.01) |

(52) U.S. Cl.
CPC .......... *H04W 12/50* (2021.01); *G06F 13/102* (2013.01); *H04L 9/30* (2013.01); *H04W 12/037* (2021.01); *H04W 12/06* (2013.01)

(58) Field of Classification Search
CPC ... H04W 12/50; H04W 12/037; H04W 12/06; H04W 12/068; G06F 13/102; H04L 9/30; H04L 63/0442; H04L 2209/80; H04L 9/3226
See application file for complete search history.

(56) References Cited

U.S. PATENT DOCUMENTS

| | | | | |
|---|---|---|---|---|
| 6,088,802 A | * | 7/2000 | Bialick | ............ G06F 21/34 |
| 10,938,743 B1 | * | 3/2021 | Andrews | ............ H04L 47/822 |

(Continued)

OTHER PUBLICATIONS

Dolev et al., "Peripheral Authentication for Autonomous Vehicles", Dec. 2016, IEEE 15th International Symposium on Network Computing and Applications, pp. 282-285 (Year: 2016).*

*Primary Examiner* — Kenneth W Chang
(74) *Attorney, Agent, or Firm* — Polsinelli

(57) ABSTRACT

Methods, systems, computer-readable media, and apparatuses for an authentication-based communication link with a peripheral device are presented. In some embodiments, the peripheral device receives, from a host device, and stores, in a memory of the peripheral device, registration data including, for instance, a user credential, a user identifier, and/or a device identifier. Upon a request to pair the peripheral device with the same or a different host device, the peripheral device requests and receives, from such a host device, authentication data including a user credential, a user identifier, and/or a device identifier. The peripheral device determines whether a match exists between the received authentication data and the registration data. If so, a communication link is established with the host device.

28 Claims, 11 Drawing Sheets

(56) References Cited

U.S. PATENT DOCUMENTS

| | | | | |
|---|---|---|---|---|
| 2005/0033968 A1* | 2/2005 | Dupouy | ............... | G06F 21/34 |
| | | | | 726/19 |
| 2008/0005116 A1* | 1/2008 | Uno | ............... | G06F 3/0622 |
| | | | | 707/999.009 |
| 2008/0274696 A1* | 11/2008 | Bakshi | ............... | H04M 1/6066 |
| | | | | 455/41.2 |
| 2008/0294759 A1* | 11/2008 | Biswas | ............... | H04L 41/0246 |
| | | | | 726/4 |
| 2012/0297205 A1* | 11/2012 | Yuen | ............... | G06F 21/31 |
| | | | | 713/193 |
| 2016/0056884 A1* | 2/2016 | Dave | ............... | H04W 12/08 |
| | | | | 455/41.2 |

* cited by examiner

AUTHENTICATION-BASED COMMUNICATION LINK WITH A PERIPHERAL DEVICE

BACKGROUND

Aspects of the disclosure relate to connecting peripheral devices and host devices. A peripheral device can connect to a host device over a communication link, such as a wireless link according to a communication protocol. Once connected, the peripheral device provides different functionalities that are available from the host device or that extends the functionalities of the host device.

For example, many different types of peripheral devices are available to a user and support the Bluetooth protocol, including headphones, headsets, speakers, virtual reality (VR) devices, and augmented reality (AR) devices. The user can pair any of such peripheral devices with a host device, such as with a mobile device. Once paired, a Bluetooth link is established between the peripheral device and the host device. In the case of a headphone, headset, or speaker, audio can be transmitted from the host device over the Bluetooth link and presented by the peripheral device. In the case of a VR device or an AR device, audio and video can be transmitted from the host device and pose data can be transmitted from the peripheral device over the Bluetooth link.

BRIEF SUMMARY

Certain embodiments are described to enable authentication-based communication links with peripheral devices. In an example, a method is implemented by a peripheral device. The method includes establishing a first communication link with a first host device according to a pairing procedure of a wireless communication protocol. The method also includes sending, to the first host device, a request for a user credential over the first communication link. The method also includes receiving, from the first host device, the user credential over the first communication link. The method also includes storing the user credential in a memory of the peripheral device. The method also includes, upon a request for a second communication link with the first host device or a second host device, performing an authentication based on the user credential stored in the memory. The method also includes establishing the second communication link based on the authentication.

In an example, the method further includes sending, to the first host device, a secret over the first communication link and receiving, from the first host device and over the first communication link, an acknowledgement that the secret is verified. The request for the user credential is sent in response to the acknowledgement. In this example, the method can additionally include receiving, from the first host device and over the first communication link, data indicating a capability of the first host device to support the authentication. The user credential is requested according to the capability of the first host device. In this example, the method can additionally include sending, to the first host device and over the first communication link, a public key of the peripheral device in response to the acknowledgement, where the user credential is encrypted by the first host device with the public key, and decrypting the user credential with a private key of the peripheral device, where the user credential is stored in the memory after being decrypted.

In an example, performing the authentication includes determining, prior to establishing the second communication link with the first host device, that the authentication was not previously performed in association with the first host device. sending an authentication request to the first host device, receiving, from the first host device, a second user credential in response to the authentication request, determining a match between the second user credential and the user credential stored in the memory, where the second communication link is established with the first host device based on the match. In this example, the method can additionally include storing, in the memory, data indicating the match, upon receiving a request for a third communication link with the first host device and based on the data, determining that the authentication was previously performed in association with the first host device, and establishing the third communication link without re-performing the authentication.

In an example, the method further includes, while the second communication link is established with the first host device, sending a request for an authentication check to a background process of the first host device, receiving the authentication check, and maintaining the second communication link based on the authentication check.

In an example, the method further includes receiving, from the first host device and over the first communication link, a first identifier of the first host device and a second identifier of the second host device, storing, in the memory, the first identifier and the second identifier, upon a scan from a host device to establish the second communication link according to the pairing procedure, determining whether a match exits between a device identifier of the host device and at least one of the first identifier or the second identifier stored in the memory, and responding to the scan with an identifier of the peripheral device upon determining that the match exists, or ignoring the scan upon determining that the match does not exist.

In an example, the method further includes receiving, from the first host device and over the first communication link, a first identifier of the first host device and a second identifier of the second host device, storing, in the memory, the first identifier and the second identifier, receiving, from the second host device, a request for the second communication link and a device identifier, and determining a match between the device identifier and the second identifier, where the second communication link is established based on the match. In this example, the method can additionally include receiving, from a third host device, a request for a third communication link with the third host device, determining that a device identifier of the third host device does not match any of the first identifier or the second identifier, and rejecting the request for the third communication link.

In an example, the method further includes receiving, from the first host device and over the first communication link, device identifiers corresponding to host devices authorized to connect with the peripheral device and a user identifier corresponding to a user authorized to use the peripheral device, storing, in the memory, the device identifiers and the user identifier, receiving, from a third host device, a request for a third communication link, determining that a device identifier of the third host device does not match any of the device identifiers, and outputting a notification indicating the user identifier.

In an example, a peripheral device includes one or more processors, and one or more memories storing computer-readable instructions that, upon execution by at least one of the one or more processors, configure the peripheral device to establish a first communication link with a first host device according to a pairing procedure of a wireless communication protocol, send, to the first host device, a request for a user credential over the first communication link, receive, from the first host device, the user credential over the first communication link, store the user credential in at least one of the one or more memories of the peripheral device, upon a request for a second communication link with the first host device or a second host device, perform an authentication based on the user credential, and establish the second communication link based on the authentication.

In an example, the execution of the computer-readable instructions further configures the peripheral device to receive, from the first host device and over the first communication link, a first identifier of the first host device and a second identifier of the second host device, store, in the at least one of the one or more memories, the first identifier and the second identifier, receive, from the second host device, a request for the second communication link and a device identifier, and determine a match between the device identifier and the second identifier, wherein the second communication link is established based on the match. In this example, the execution of the computer-readable instructions can further configures the peripheral device to determine, prior to establishing the second communication link with the second host device, that the authentication was not previously performed in association with the second host device, send an authentication request to the second host device, receive, from the second host device, a second user credential in response to the authentication request, and determine a second match between the second user credential and the user credential, where the second communication link is established based on the second match. Additionally, the execution of the computer-readable instructions further configures the peripheral device to store, in the at least one of the one or more memories, data indicating the second match, upon receiving a request for a third communication link with the second host device and based on the data, determine that the authentication was previously performed in association with the second host device, and establish the third communication link without re-performing the authentication. The execution of the computer-readable instructions further configures the peripheral device to receive, from a third host device, a request for a third communication link with the third host device, determine that a device identifier of the third host device does not match any of the first identifier or the second identifier, and reject the request for the third communication link.

In an example, the execution of the computer-readable instructions further configures the peripheral device to receive, from the first host device and over the first communication link, device identifiers corresponding to host devices authorized to connect with the peripheral device and a user identifier corresponding to a user authorized to use the peripheral device, store, in the at least one of the one or more memories, the device identifiers and the user identifier, receive, from a third host device, a request for a third communication link, determine that a device identifier of the third host device does not match any of the device identifiers, and output a notification indicating the user identifier.

In an example, a peripheral device includes means for establishing a first communication link with a first host device according to a pairing procedure of a wireless communication protocol, means for sending, to the first host device, a request for a user credential over the first communication link, means for receiving, from the first host device, the user credential over the first communication link, means for storing the user credential in a memory of the peripheral device, upon a request for a second communication link with the first host device or a second host device, means for performing an authentication based on the user credential stored in the memory, and means for establishing the second communication link based on the authentication.

In an example, the peripheral device further includes means for receiving, from the first host device and over the first communication link, a first user identifier, means for storing the first user identifier, means for receiving, from the second host device, a request for the second communication link and a second user identifier, and means for determining a match between the first user identifier and the second user identifier, wherein the second communication link is established based on the match. In this example, the means for performing the authentication includes means for determining prior to establishing the second communication link, that the authentication was not previously performed in association with the first user identifier, means for sending an authentication request to the second host device, means for receiving, from the second host device, a second user credential in response to the authentication request, and means for determining a second match between the second user credential and the user credential, where the second communication link is established based on the second match. Additionally, the peripheral device can include means for storing data indicating the second match, upon receiving a request for a third communication link with the second host device in association, means for determining that the request for the third communication link is associated with the first user identifier, means for determining that the authentication was previously performed in association with the first user identifier, and means for establishing the third communication link without re-performing the authentication.

In an example, the peripheral device further includes means for receiving, from the first host device and over the first communication link, device identifiers corresponding to host devices authorized to connect with the peripheral device and user identifiers corresponding to users authorized to use the peripheral device, means for storing the device identifiers and the user identifiers, means for receiving, from a host device, a request for a third communication link and a user identifier, and means for determining whether a first match exists between the device identifier of the host device and the device identifier and whether a second match exists between the user identifier and the user identifiers. In this example, the peripheral device can also includes upon determining that the first match exists and the second match exists, means for determining that the authentication was previously performed in association with the device identifier and the user identifier, and means for establishing the third communication link without re-performing the authentication.

In an example, a non-transitory computer-readable storage medium storing instructions that, upon execution by a peripheral device, cause the peripheral device to perform operations. The operations include establishing a first communication link with a first host device according to a pairing procedure of a wireless communication protocol. The operations also include sending, to the first host device, a request for a user credential over the first communication link. The operations also include receiving, from the first host device, the user credential over the first communication link. The operations also include storing the user credential in a memory of the peripheral device. The operations also include, upon a request for a second communication link with the first host device or a second host device, performing an authentication based on the user credential stored in the memory. The operations also include establishing the second communication link based on the authentication.

In an example, the operations further include sending, to the first host device, a secret over the first communication link, and receiving, from the first host device and over the first communication link, an acknowledgement that the secret is verified, where the request for the user credential is sent in response to the acknowledgement. In this example, the operations can also include receiving, from the first host device and over the first communication link, data indicating a capability of the first host device to support the authentication, where the user credential is requested according to the capability of the first host device. In this example, the operations can also include sending, to the first host device and over the first communication link, a public key of the peripheral device in response to the acknowledgement, where the user credential is encrypted by the first host device with the public key, and decrypting the user credential with a private key of the peripheral device, wherein the user credential is stored in the memory after being decrypted.

In an example, performing the authentication includes determining, prior to establishing the second communication link with the first host device, that the authentication was not previously performed in association with the first host device, sending an authentication request to the first host device, receiving, from the first host device, a second user credential in response to the authentication request, and determining a match between the second user credential and the user credential stored in the memory, where the second communication link is established with the first host device based on the match. In this example, the operations can further include storing, in the memory, data indicating the match, upon receiving a request for a third communication link with the first host device and based on the data, determining that the authentication was previously performed in association with the first host device, and establishing the third communication link without re-performing the authentication.

In an example, the operations further include, while the second communication link is established with the first host device, sending a request for an authentication check to a background process of the first host device, receiving the authentication check, and maintaining the second communication link based on the authentication check.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
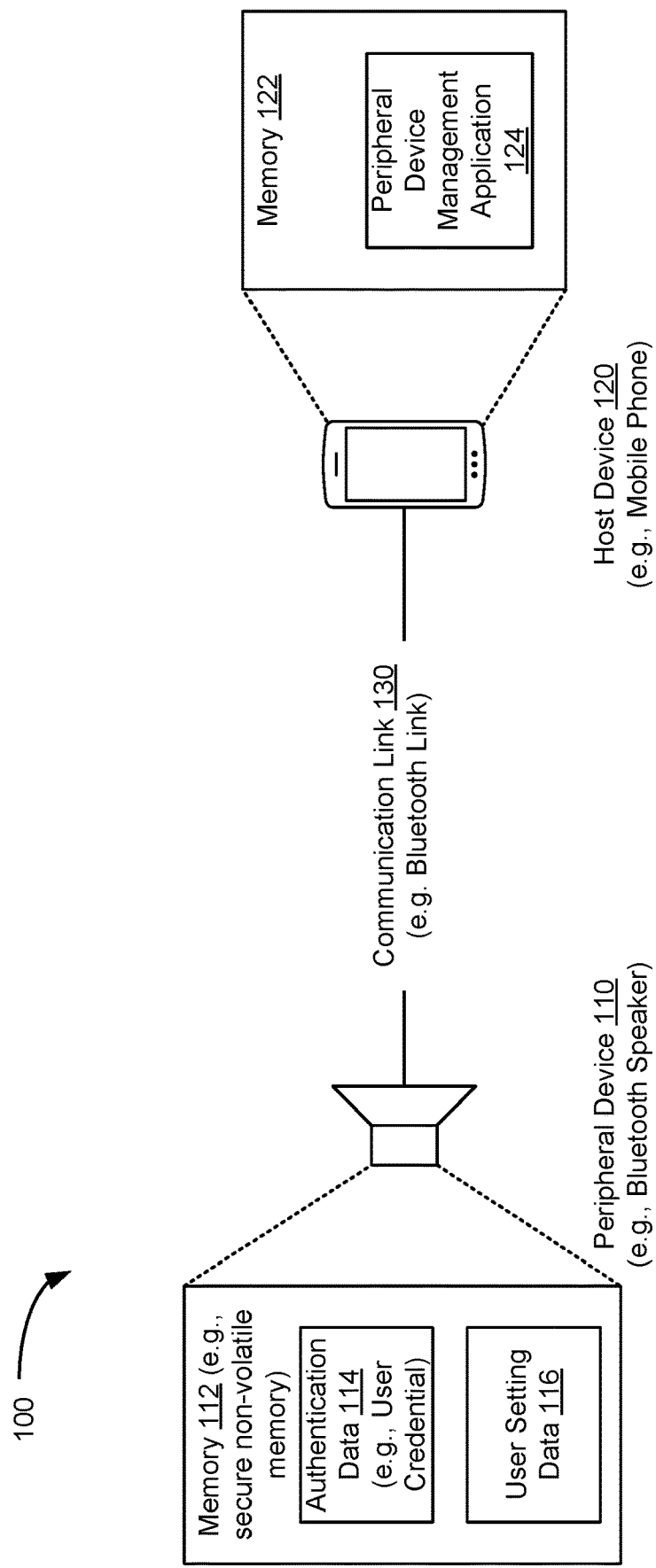
FIG. 1 illustrates an example of a communication system that includes a peripheral device and a host device, in accordance with at least one embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Embodiments of the present disclosure are directed to, among other things, an authentication-based communication link with a peripheral device. In existing communication systems, a host device and a peripheral device establish a communication link by performing a pairing procedure according to a communication protocol. The pairing procedure does not involve a user authentication and, thus, the communication link can be established regardless of the end user. The lack of user authentication permits the flexibility of pairing the peripheral device with any host device. However, this flexibility creates a security risk. In particular, an unauthorized user can pair the peripheral device with an unauthorized host device. By doing so, any sensitive data stored on the peripheral device can be accessed through the unauthorized host device. Further, theft and reuse or loss and reuse of the peripheral device are possible. In contrast, the embodiments of the present disclosure allow the flexibility of pairing a peripheral device with a number of host devices, while also mitigating the security risk without requiring a change to the communication protocol. In particular, the communication link is established following an authentication performed by the peripheral device. The authentication involves determining whether an end user is an authorized end user and/or whether the host device is an authorized host device.

In an example, upon a first boot up of a peripheral device and a first pairing with a host device that executes a peripheral device management application, the peripheral device requests and receives authentication data from the host device. The peripheral device stores the authentication data in memory (e.g., a secure memory of the peripheral device). The authentication data can include a user credential (e.g., a personal identification number (PIN), a fingerprint, and/or facial data, etc. depending on the host device's capability) and, optionally, a list of authorized host devices to pair with the peripheral device and/or list of authorized users of the peripheral device. In addition, the peripheral device can receive and store a user setting specifying the use of the authentication data. The user setting can be input at the peripheral device management application and indicate whether the user credential should always be used for pairing the peripheral device, used only for a first time pairing with an authorized host device, or not used in association with a particular host device and/or user. Depending on the user setting, a next pairing of the peripheral device with any of the authorized host devices may involve the peripheral device receiving the user credential from the host device for comparison to the authentication data stored in the memory. If a match is determined, the communication link is established. In addition, while the host device remains paired, the peripheral device can re-check the authentication based on a background process running on the host device. If an attempt is made for a pairing with an unauthorized host device, the peripheral device can output a notification about an authorized user.

To illustrate, consider the scenario of a Bluetooth headphone and a smartphone, as an example of a peripheral device and host device, respectively. The first time the pairing is performed, the Bluetooth headphone receives and stores, in a secure memory (e.g., a replay protected memory block, a erasable programmable read-only memory (EEPROM) fuse, or a secure file system on a storage), a user fingerprint to use with the smartphone, a PIN to use with a tablet, and a user identifier (ID). The Bluetooth headphone can also receive and store user setting data indicating that the fingerprint is to be used only once. Hence, the next time a pairing is attempted with the smartphone, the Bluetooth headphone requests and receives a user fingerprint from the smartphone. By matching the received fingerprint with the stored fingerprint, the end user is authenticated and the Bluetooth link is established with the smartphone. From that point on, any new pairing with the smartphone is performed without requesting the fingerprint again. For instance, it may be sufficient to receive the user ID from the smartphone to establish a Bluetooth link. In comparison, any time a pairing is performed with the tablet, the Bluetooth headphone requests and receives a PIN from the tablet and establishes the Bluetooth link when this PIN matches the stored PIN. In addition, when a pairing is requested from another host device, the Bluetooth headphone can reject this request and, optionally, output a notification about the user ID to identify the authorized user (e.g., in case of a loss of the peripheral device, this type of notification facilitates the identification of the authorized user). A "secret" refers to data that is known to only a set of computing resources and/or corresponding set of users. A "shared secret" refers to a secret that is shared between such set of computing resources and/or set of users. Examples of a secret includes a random code or a hash thereof, where the random code or hash is stored in a memory of a peripheral device and/or printed on a label attached to or packed with the peripheral device. The random code or the hash is a shared secret when entered at or detected by a host device, in which case random code or the hash is shared between the peripheral device and the host device. A "private key" and a "public key" refer to asymmetric encryption keys, where the private key is known only to a first device (e.g., a peripheral device) and the public key is known to the first device and a second device (e.g., a host device), and to potentially other devices. The second device uses the public key to encrypt data. The first device decrypts the data with the private key.

In the interest of clarity of explanation, embodiments of the present disclosure are described in connection with the Bluetooth protocol. However, the embodiments are not limited as such. Instead, the embodiments similarly apply to any other type of communication protocol, whether wireless or wired, including, for instance, Zigbee, WiFi, or other wireless personal area network (WPAN) protocols and/or wireless local area network (WLAN) protocols. A pairing procedure generally refers to a set of operations that may be performed by a peripheral device and/or a host device, by which data is exchanged between the peripheral device and the host device to establish a communication link between them. A communication protocol typically specifies specific types of data to be exchanged and specific operations to be performed during the pairing procedure.

Also in the interest of clarity of explanation, a "user credential" refers to data that can be personalized to a user and that can be used verify that the user is authorized to use a peripheral device or a host device. Examples of the use credential include a personal identification number (PIN), a graphical user interface (GUI) pattern, a password, fingerprint data, facial data, and the like.

FIG. 1 illustrates an example of a communication system 100 that includes a peripheral device 110 and a host device 120, in accordance with at least one embodiment. The peripheral device 110 and the host device 120 establish a communication link 130, such as a Bluetooth link, based on an authentication performed by the peripheral device.

In an example, the peripheral device 110 can be a computing device that can be connected to the host device 120 as an auxiliary device that provides, to a user, functionalities available from the host device 120 or extends, to the user, the functionalities of the host device 120. Generally, the peripheral device 110 includes one or more processors and one or memories storing computer-readable instructions that are executable by the one or more processors. The execution of the computer-readable instructions configure the peripheral device 110 to connect with the host device 120 as the auxiliary device. For instance, the peripheral device 110 can be any of a Bluetooth-enabled headphone, headset, speaker, virtual reality (VR) device, augmented reality (AR) device, or computing device that can be set-up as an auxiliary device.

As illustrated in FIG. 1, the one or memories include a memory 112 that stores authentication data 114 and user setting data 116. The memory 112 or a portion thereof storing at least the authentication data 114 can be a secure non-volatile memory, such as by being a replay protected memory block, an EEPROM fuse, or a secure file system on non-volatile memory. The authentication data 114 and the user setting data 116 can be received during an initial registration of the peripheral device as further described in the next figures.

The authentication data 114 includes data usable by the peripheral device 110 to perform an authentication, by which the peripheral device 110 determines whether a user of the host device 120 is also authorized to use the peripheral device 110 and/or if the host device 120 is authorized to connect with the peripheral device 110. For instance, the authentication data 114 includes a user credential, such as any of a PIN, a graphical user interface (GUI) pattern, a password, a fingerprint, facial data, that and/or other data uniquely identifies an authorized user. The authentication data 114 can also include an identifier of the host device 120

(referred to herein as a device ID), such as a media access control (MAC) address, an international mobile equipment identity (IMEI), and/or any other data that uniquely identifies the host device 120.

The user setting data 116 includes data representing user settings about the use of the authentication data 114. For instance, the user setting data 116 indicates whether a user credential should be requested every time or a number of times (e.g., only the first time) when a Bluetooth link is to be established, whether the peripheral device 110 is to be made visible to host devices upon a Bluetooth scan, whether another host device can be connected for a predefined period of time without needing to whitelist this host device (e.g., by including its device ID in the authentication data 114), and/or whether an authentication check should be performed and the frequency of performing this authentication check while a Bluetooth link remains established.

In an example, the host device 120 can be a computing device that can be connected to the peripheral device 110 to provide functionalities, resources, services, and applications to the peripheral device 110. Generally, the host device 120 includes one or more processors and one or memories storing computer-readable instructions that are executable by the one or more processors. The execution of the computer-readable instructions configure the host device 120 to connect to the peripheral device 110 and provide the functionalities, resources, services, and applications. For instance, the host device 110 can be any of a mobile device, including a smart phone, a tablet, or a laptop, a desktop computer, or any other computing device that can be set-up as a host of the functionalities, resources, services, and applications.

As illustrated in FIG. 1, the one or memories include a memory 122 that stores, as program code, computer-readable instructions for a peripheral device management application 124. The computer-readable instructions can be downloaded from an application store, as an application kit, and installed on the host device 120. The peripheral device management application 124 provides functionalities to manage how the peripheral device 110 can be paired with one or more host devices. For instance, the peripheral device management application 124 provides a user interface, such as a GUI, for receiving the authentication data 114 and the user setting data 116, sends authentication data 114 and the user setting data 116 to the peripheral device 110 as part of the initial registration or a subsequent update, and responds to authentication check requests by performing an authentication check in a background process.

Figure 2:
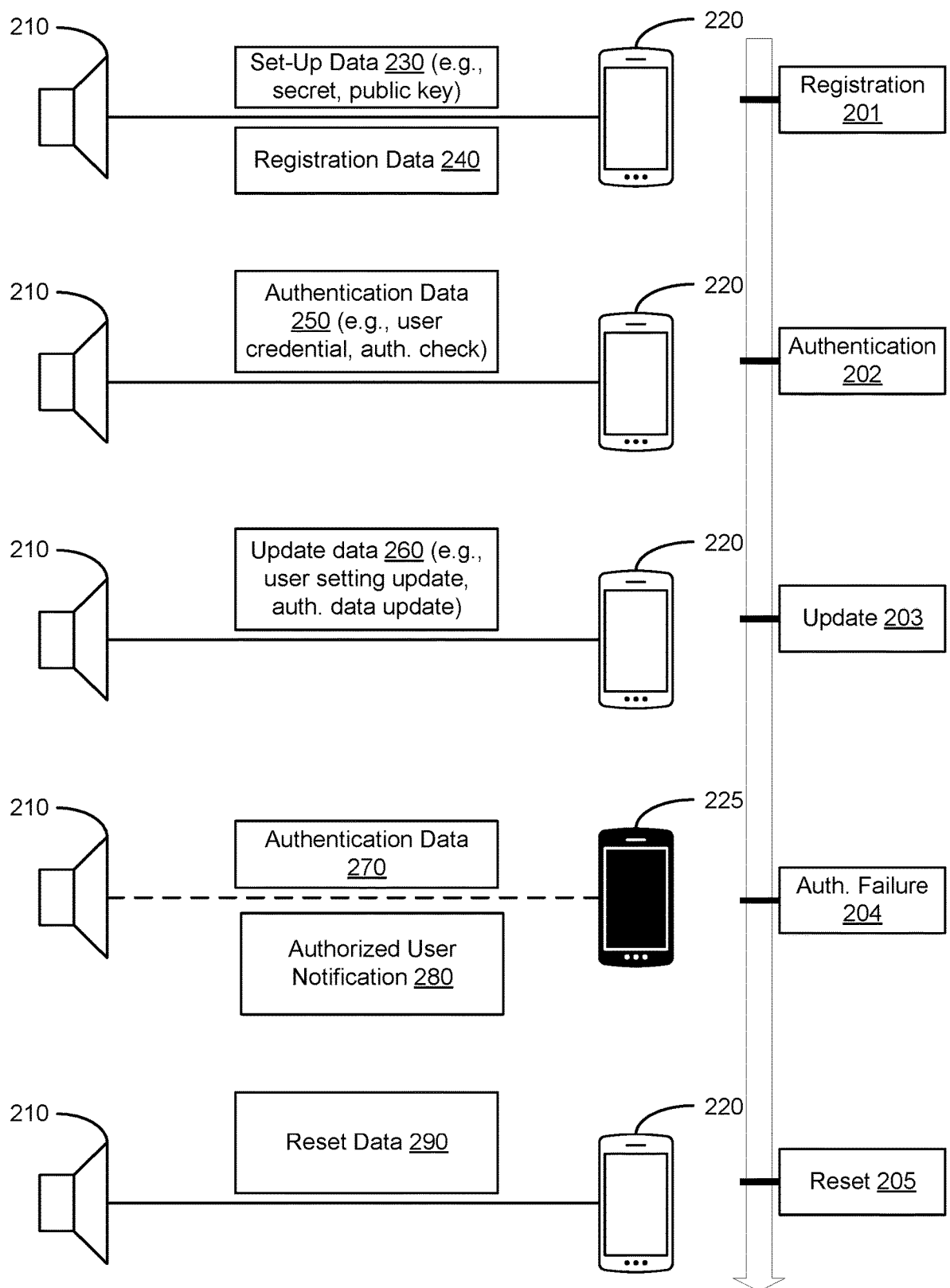
FIG. 2 illustrates example stages for an authentication-based communication link between a peripheral device and a host device, in accordance with at least one embodiment.

FIG. 2 illustrates example stages for an authentication-based communication link between a peripheral device 210 and a host device 220, in accordance with at least one embodiment. The peripheral device 210 and the host device 220 are examples of the peripheral device 110 and the host device 120, respectively. The stages include a registration stage 201, an authentication stage 202, an update stage 203, an authentication failure stage 204, and a reset stage 205, each of which is further described herein next.

In an example, during the registration stage 201, data is exchanged between the peripheral device 210 and the host device 220 such that a registration of the peripheral device 210 with the host device 220 is performed. The registration enables the peripheral device 210 to receive authentication data and user setting data, similar to the authentication data 114 and the user setting data 116, respectively.

In particular, the first time the peripheral device 210 boots up or following a reset of the peripheral device 210 (e.g., per the reset stage 205), the peripheral device 210 pairs with the host device 220 and establishes a Bluetooth link. Over the Bluetooth link, the peripheral device 210 sends set-up data 230 including, for instance, a shared secret and a public key of the peripheral device 210. The shared secret and the public key may be pre-stored in a secure memory of the peripheral device 210. The shared secret is used by the host device 220 to bind the peripheral device 210 and the host device 220, as further described in FIG. 6. Following the binding, the public key is used by the host device 220 to encrypt registration data 240 sent to the peripheral device 210 over the Bluetooth link during the registration stage 201, as also further described in FIG. 6. The registration data 240 includes the authentication data, the user setting data, and capability data indicating capability of the host device 220 to support the authentication (e.g., whether the host device 220 can provide different types of user credentials including a PIN, a GUI pattern, a password, a fingerprint, and/or facial data and a priority for using the different user credential types). The binding and the transmission of the registration data 240 can be performed by a peripheral device management application executing on the host device 220, similar to the peripheral device management application 124. The peripheral device 210 receives the registration data 240, decrypts it with the corresponding private key, and stores the decrypted registration data in the secure memory.

In an example, during the authentication stage 202, a new pairing between the peripheral device 110 and the host device 220 (or any other authorized device as further described in FIGS. 3 and 5) is to be performed to establish another Bluetooth link. Depending on the user setting data stored at the peripheral device 210, the peripheral device 210 can respond to a Bluetooth scan request from the host device 220 by sending a device ID of the peripheral device 210, such that the peripheral device 210 can be identified to a user via a GUI of the host device 220 and can be selected via the GUI for the pairing. The peripheral device 210 can also request and receive authentication data 250 from the host device 220 (e.g., any of the user credential, device ID, user ID, and/or authentication check to be performed in a background process depending on the user setting data). By comparing the received authentication data 250 with the authentication data stored in the secure memory, the peripheral device 210 determines whether a match exists. If a match exists, the peripheral device 210 establishes the Bluetooth link with the host device 220. This use of the authentication data 250 (e.g., requesting and matching it) is part of the authentication performed by the peripheral device, in addition to any other operations of the pairing procedure specified by the Bluetooth protocol, to establish the Bluetooth link.

In an example, during the update stage 203, some or all portions of the registration data 240 can be changed. For instance, the user may change their user credential, change the user setting, and/or desire to add a new host device. In addition, new capability can become supported by the host device 220. Accordingly, the peripheral management device may receive, as applicable, user input and generate update data 260 that specifies any of such updates. The host device 220 sends the update data 260 over a Bluetooth link (this Bluetooth link may be established according to the operations of the authentication stage 202).

In an example, during the authentication failure stage 204, an unauthorized host device 225 attempts to pair with the peripheral device 210, but because of an authentication failure, the corresponding Bluetooth link is not established (as illustrated with the dashed line in FIG. 2). In particular, and based on the user setting data stored in the secure memory, the peripheral device 210 requests authentication data 270 (e.g., a device ID and a user ID) from the unauthorized host device 225. If the unauthorized host device 225 does not respond with the authentication data 270 or the authentication data 270 is sent, but does not match the registration data 240, the peripheral device 210 does not establish the Bluetooth link. In addition, the peripheral device 210 can output an authorized user notification 280 identifying an authorized user of the peripheral device 210 based on the registration data 240. The authorized user notification 280 can be output to a user interface of the peripheral device 210 (e.g., a voice user interface or a GUI, as applicable) or sent to the unauthorized user device 225 for presentation threat.

In an example, during the reset stage 205, an authorized user may desire to reset the registration data 240. A Bluetooth link is established between the peripheral device 210 and the host device 220 (e.g., according to the operations of the authentication stage 202). The peripheral management device may receive user input indicating the reset and generate reset data 280 that indicates a command to erase the authentication data 240 from the secure memory. The host device 220 sends the reset data over the Bluetooth link and, in response, the peripheral device erases the authentication data 240. Additionally or alternatively, rather than receiving the reset data 290 from the host device 220, similar reset data 290 can be generated by the peripheral device 210 locally in response to user input at a user interface of the peripheral device 210 (e.g., via a GUI or as a long press of a reset button on the peripheral device 210).

Figure 3:
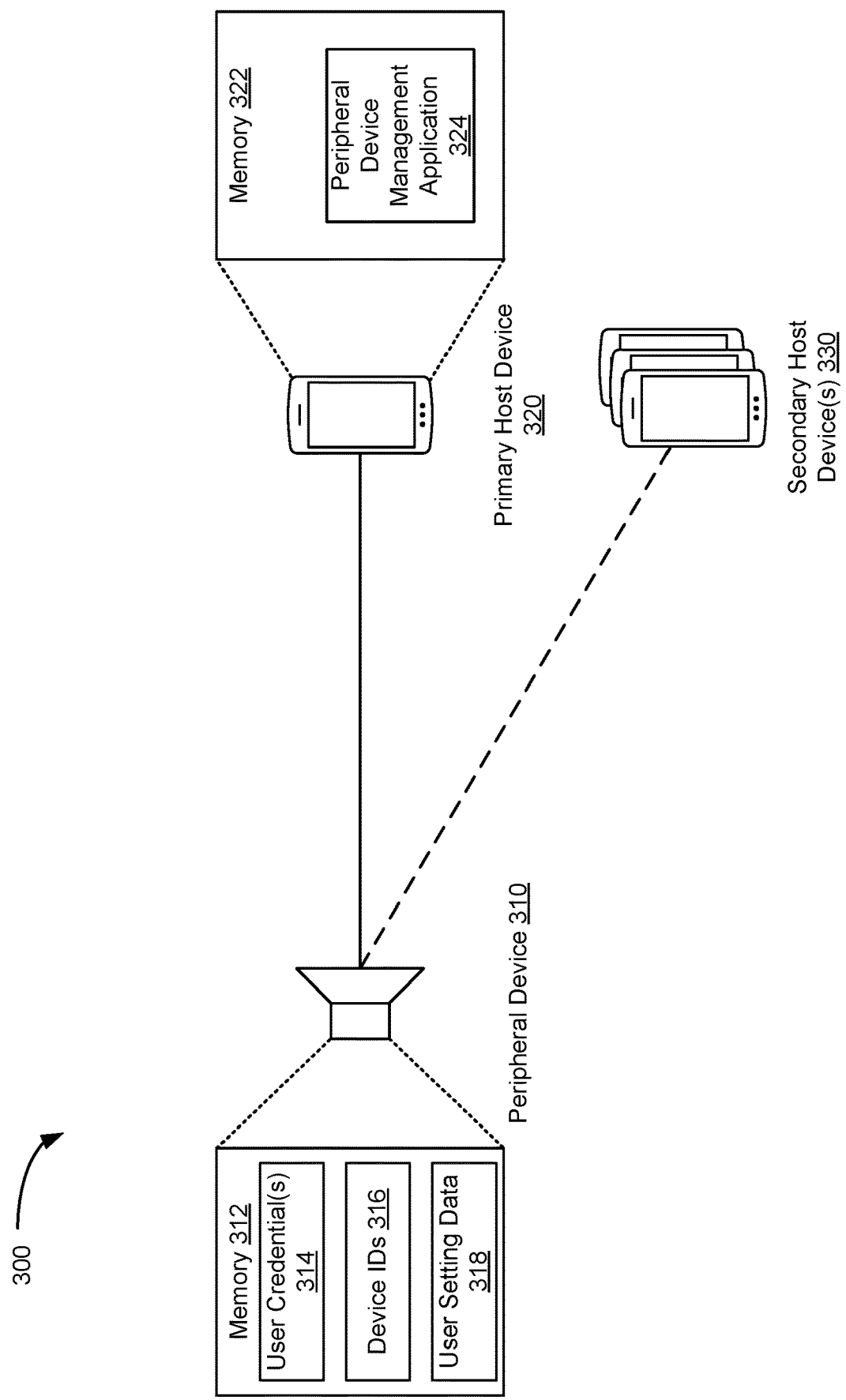
FIG. 3 illustrates another example of a communication system that includes a peripheral device and multiple host devices, in accordance with at least one embodiment.

FIG. 3 illustrates another example of a communication system 300 that includes a peripheral device 310 and multiple host devices, in accordance with at least one embodiment. The host devices include a primary host device 320 and one or more secondary host devices 330. The peripheral device 310 and the primary host device 320 are examples of the peripheral device 110 and the host device 120, respectively. In particular, the peripheral device 310 stores, in a memory 312 (e.g., a secure memory), registration data usable in an authentication performed while pairing with any of the host devices. The primary host device 320 executes a peripheral device management application 324 based on program code stored in a memory 322, similar to the peripheral management application 124 to provide the registration data to the peripheral device 310 during a registration phase, an authentication check during an authentication state, a registration update during an update stage, and/or reset data during a reset stage. A secondary host device 330 can be similar to the primary host device 320, but may not (although possible) execute a peripheral device management application.

Because an authorized user can pair the peripheral device 310 with multiple authorized host devices (e.g., any of the primary host device 320 or the secondary host devices 330), the registration data stored in the memory 312 of the peripheral device 310 reflects this potential. In an example, the registration data includes one or more user credentials 314, device IDs 316 of the host devices 320-330, and user setting data 318. The user credential(s) 314 and the device IDs 316 form authentication data usable in the authentication performed by the peripheral device 310. The user setting data 318 specifies how the authentication data is to be used in the authentication.

In particular, the authorized user may input different user credentials that are received and sent from the peripheral device management application 324 of the primary host device 320. Although one user credential may be sufficient, the user input may specify multiple user credentials and indicate an association between each user credential and a set of authorized host devices. For instance, the user input can include a PIN to use on a tablet, a fingerprint to use on a laptop, facial data to use on a smartphone, and a password to use with the tablet, laptop, and smartphone. Additionally or alternatively, the type of a user credential for use with an authorized host device can depend on the capability of the host device. The peripheral device 310 receives such user credential(s) (encrypted with a public key of the peripheral device 310) and stores them in the memory 312 (after decryption with a private key of the peripheral device 310). Similarly, the peripheral device 310 receives and stores the device IDs 316 in the memory 312. The two types of authentication data can be stored in association with each other in a data structure to indicate how they are to be used together. For instance, the peripheral device 310 stores a table, where a first column lists the device IDs 316 and a next column lists the user credentials 314, such that a row in the table indicates one or more credentials applicable to a device ID.

Similarly to the user setting 116, here the user setting 318 indicates whether a user credential should be requested every time or a number of times (e.g., only the first time) when a Bluetooth link is to be established with an authorized host device, whether the peripheral device 310 is to be made visible to host devices upon a Bluetooth scan, whether an unauthorized host device can be connected for a predefined period of time without needing to whitelist this host device (e.g., by including its device ID in the stored devices IDs 116), and/or whether an authentication check should be performed and the frequency of performing this authentication check while a Bluetooth link remains established. For instance and referring back to the tablet and laptop example, the user setting 318 can indicate that the PIN is to be entered and checked every time before establishing a Bluetooth connection with the tablet, but that the fingerprint is to be used once and the password to be used from that point on.

Figure 4:
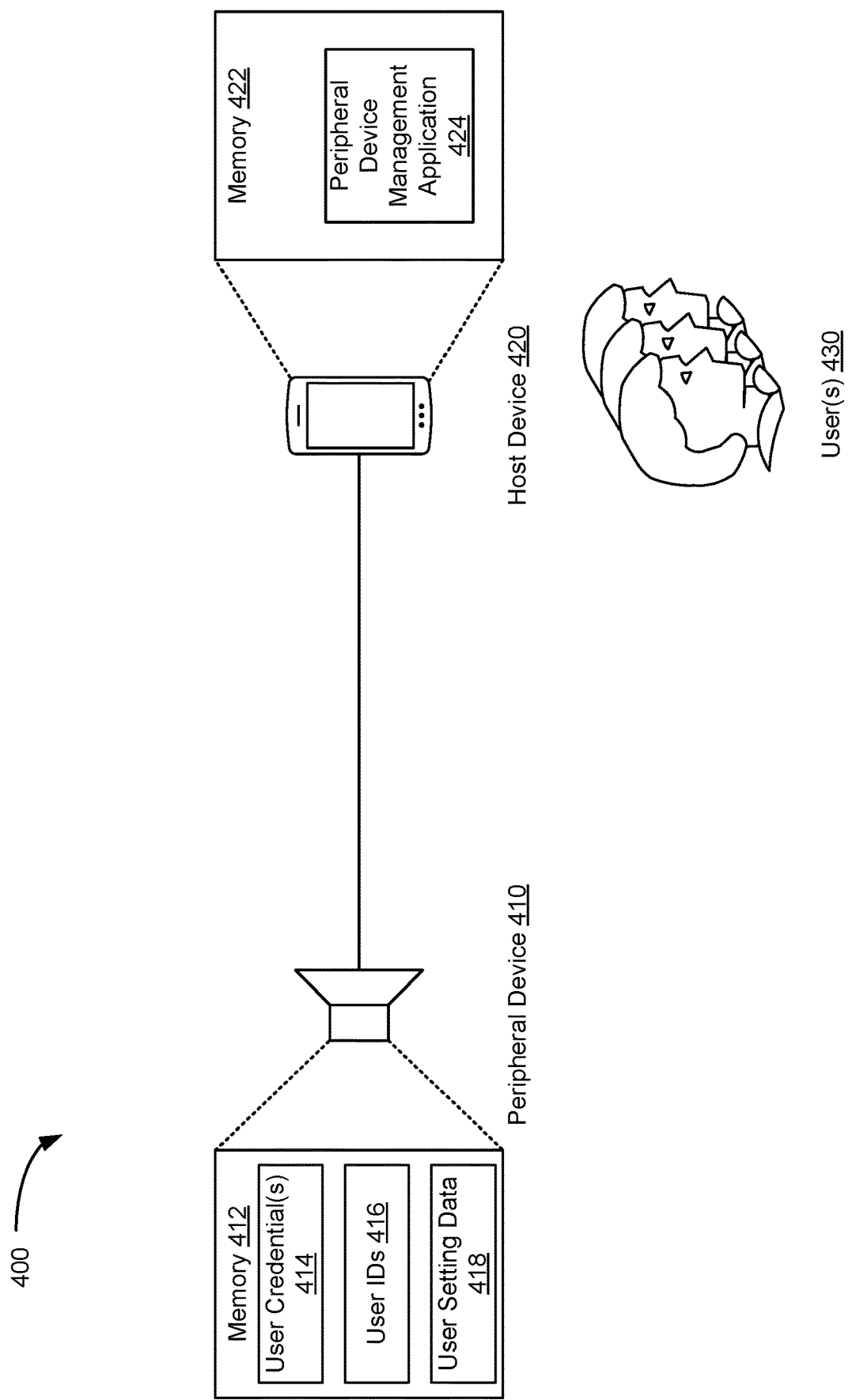
FIG. 4 illustrates another example of a communication system that includes a peripheral device and a host device available to multiple users, in accordance with at least one embodiment.

FIG. 4 illustrates another example of a communication system 400 that includes a peripheral device 410 and a host device 420 available to multiple users 430, in accordance with at least one embodiment. The peripheral device 410 and the host device 420 are examples of the peripheral device 110 and the host device 120, respectively. In particular, the peripheral device 110 stores, in a memory 412 (e.g., a secure memory), registration data usable in an authentication performed while pairing with the host device 420. The host device 420 executes a peripheral device management application 424 based on program code stored in a memory 422, similar to the peripheral management application 124 to provide the registration data to the peripheral device 410 during a registration phase, an authentication check during an authentication state, a registration update during an update stage, and/or reset data during a reset stage.

Because multiple users are authorized to pair the peripheral device 410 with the host device 420 (referred to as authorized users), the registration data stored in the memory 412 of the peripheral device 410 reflects this potential. In an example, the registration data includes one or more user credentials 414, user IDs 416 of the authorized users 430, and user setting data 418. The user credential(s) 414 and the user IDs 416 form authentication data usable in the authentication performed by the peripheral device 410. The user setting data 418 specifies how the authentication data is to be used in the authentication. In this way, the registration data can be used as an access control list that controls the pairing of the peripheral device 410 with the host device 420 depending on the end user of the host device 420.

In particular, the peripheral device management application 424 can send the user IDs 416, each uniquely identifying an authorized user (e.g., a user ID of the authorized user can be a username unique to the authorized user). For each of the user ID, the peripheral device management application 424 can also send one or more user credentials to be used in association with the corresponding authorized user. As applicable, the same user credential (e.g., a PIN) can be shared and used by multiple ones of the authorized users 430. The peripheral device 410 can store the two types of authentication data in association with each other in a data structure to indicate how they are to be used together. For instance, the peripheral device 410 stores a table, where one column lists the user IDs 416 and a next column lists the user credentials 414, such that a row in the table indicates a user ID and one or more user credentials applicable to the user ID.

Similarly to the user setting 116, here the user setting 418 indicates whether a user credential should be requested every time or a number of times (e.g., only the first time) when a Bluetooth link is to be established with the host device 420 that is being used by an authorized user, whether the peripheral device 410 is to be made visible to host devices upon a Bluetooth scan and depending on the user IDs of users of the host devices, whether an unauthorized host device can be connected for a predefined period of time without needing to whitelist this host device depending on a user ID, and/or whether an authentication check should be performed and the frequency of performing this authentication check for a user ID while a Bluetooth link remains established.

To illustrate, the host device 420 is a tablet. The authorized users 430 include an administrator and an operator. Input of the administrator via the peripheral device management application 424 may identify the administrator's username and the operator's user name, a PIN to be used by the administrator and a PIN to be used by the operator. The input may also identify that the administrator's PIN is to be used once, whereas the operator's PIN is to be repeatedly used. Subsequently, upon a Bluetooth link request from the host device 420, the peripheral device 410 also receives a username. If the username matches the administrator's username, the peripheral device 410 proceeds with establishing the Bluetooth link. In comparison, if the username matches the operator's username, the peripheral device 410 request a PIN and, only upon receiving and matching this PIN with the stored operator's PIN, the peripheral device 410 proceeds with establishing the Bluetooth link.

Figure 5:
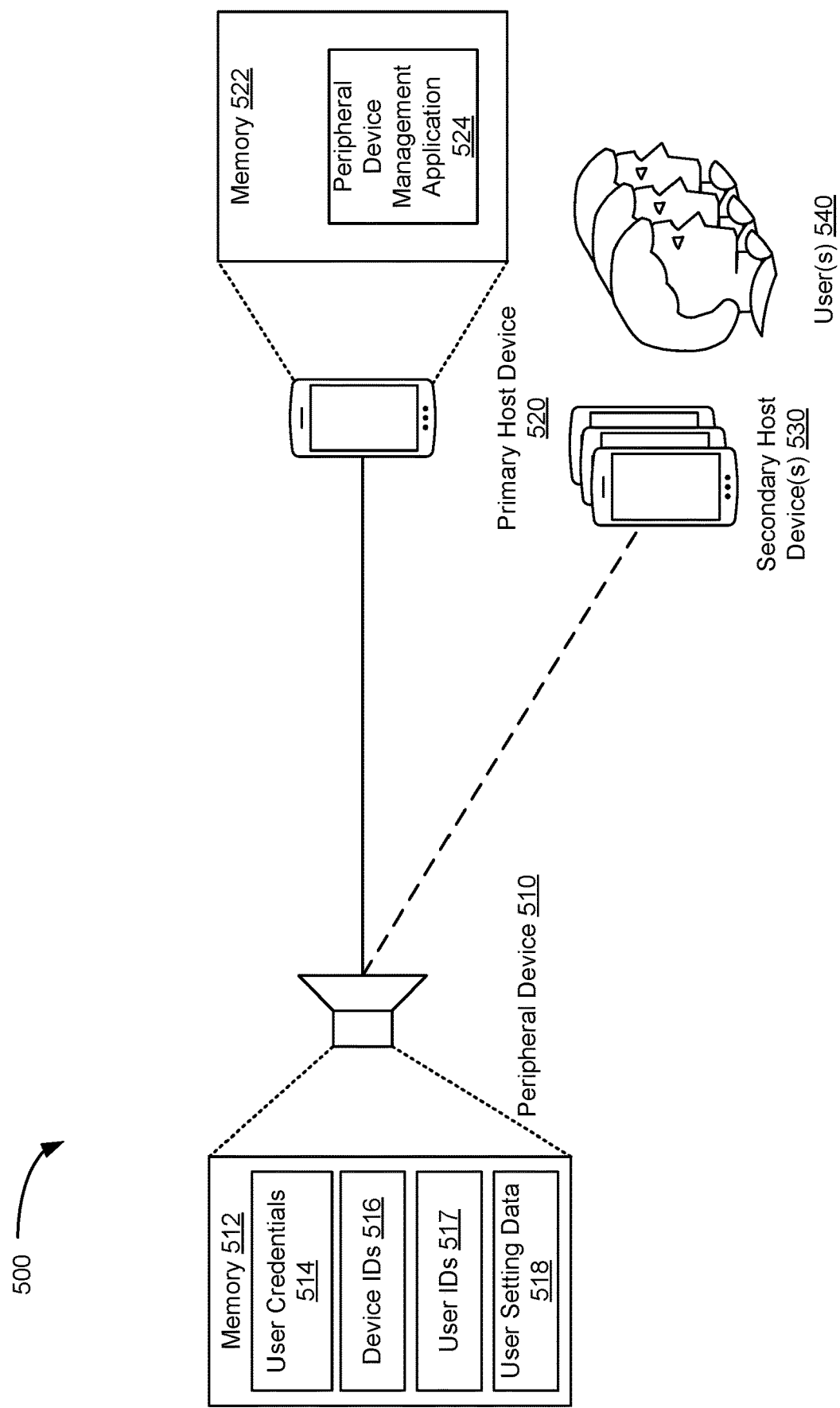
FIG. 5 illustrates another example of a communication system that includes a peripheral device and multiple host devices available to multiple users, in accordance with at least one embodiment.

FIG. 5 illustrates another example of a communication system 500 that includes a peripheral device 510 and multiple host devices available to multiple users 540, in accordance with at least one embodiment. The peripheral device 510 is an example of the peripheral device 110. The host devices include a primary host device 520 and a number of secondary host devices 530, similar to the primary host device 320 and the secondary host device 330, respectively. And the users 540 represent authorized users, each authorized to pair the peripheral device 510 with one or more of the primary host device 520 and/or the secondary host device(s) 530. In a way, the communication system 500 represents a combination of the communication system 300 and the communication system 400.

In an example, the peripheral device 510 stores, in a memory 512 (e.g., a secure memory), registration data usable in an authentication performed while pairing with any of the host devices 520-530. The primary host device 520 executes a peripheral device management application 524 based on program code stored in a memory 522, similar to the peripheral management application 124 to provide the registration data to the peripheral device 510 during a registration phase, an authentication check during an authentication state, a registration update during an update stage, and/or reset data during a reset stage.

Because any one of the users 540 is authorized to pair the peripheral device 510 with specific ones of the authorized host devices (e.g., the primary host device 520 or the secondary host devices 530), the registration data stored in the memory 512 of the peripheral device 510 reflects this potential. In an example, the registration data includes one or more user credentials 514, device IDs 516 of the host devices 520-330, user IDs 517 of the users 540, and user setting data 518. The user credential(s) 514, device IDs 516, and user IDs 517 form authentication data usable in the authentication performed by the peripheral device 510. The user setting data 518 specifies how the authentication data is to be used in the authentication.

In particular, the peripheral device management application 514 may send (e.g., based on input of an authorized user with proper access privileges (e.g., an administrator) at the primary host device 520) the user credentials 514, device IDs 516, user IDs 517, and user setting data 518 to the peripheral device 510. In response, the peripheral device 510 decrypts, as applicable, the received data and stores it the memory 512. The different types of authentication data can be stored in association with each other in a data structure to indicate how they are to be used together. For instance, the peripheral device 510 stores a table, where a first column lists the device IDs 516, a next column lists the user IDs 517, and another column lists the user credentials 514, such that a row in the table indicates one or more credentials applicable to a device ID and a user ID.

Similarly to the user setting 116, here the user setting 518 indicates whether a user credential should be requested every time or a number of times (e.g., only the first time) when a Bluetooth link is to be established with an authorized host device that is being used by an authorized user, whether the peripheral device 510 is to be made visible to host devices upon a Bluetooth scan and depending on the user IDs of users of the host devices, whether an unauthorized host device can be connected for a predefined period of time without needing to whitelist this host device or a user thereof, and/or whether an authentication check should be performed and the frequency of performing this authentication check for a device ID and a user ID while a Bluetooth link remains established.

To illustrate, the primary host device 520 is a laptop and a secondary host device is a tablet. The users 530 include an administrator and an operator. Input of the administrator via the peripheral device management application 524 may identify the administrator's username and the operator's user name, a fingerprint to be used by the administrator when pairing the laptop with the peripheral device 510 and a PIN to be used by the operator when pairing the tablet. The input may also identify that the administrator's fingerprint is to be used repeatedly, that no PIN is required for the administrator to pair the tablet, that the operator is not authorized to pair the laptop with the peripheral device 510, and that the operator's PIN is to be repeatedly used for the pairing of the tablet. Subsequently, upon a Bluetooth link request from the laptop, the peripheral device 510 also receives a username from the laptop. If the username matches the administrator's username, the peripheral device 510 requests and receives a fingerprint and proceeds with establishing the Bluetooth link if the fingerprint matches the one stored in association with the administrator's username. If the username matches the operator's username, the Bluetooth link request is rejected. Similarly, upon a Bluetooth link request from the tablet, the peripheral device 510 also receives a username from the tablet. If the username matches the administrator's username, the peripheral device 510 proceeds with establishing the Bluetooth link. If the username matches the operator's username, the peripheral device 510 requests and receives a PIN and proceeds with establishing the Bluetooth link if the PIN matches the one stored for the operator.

Figure 6:
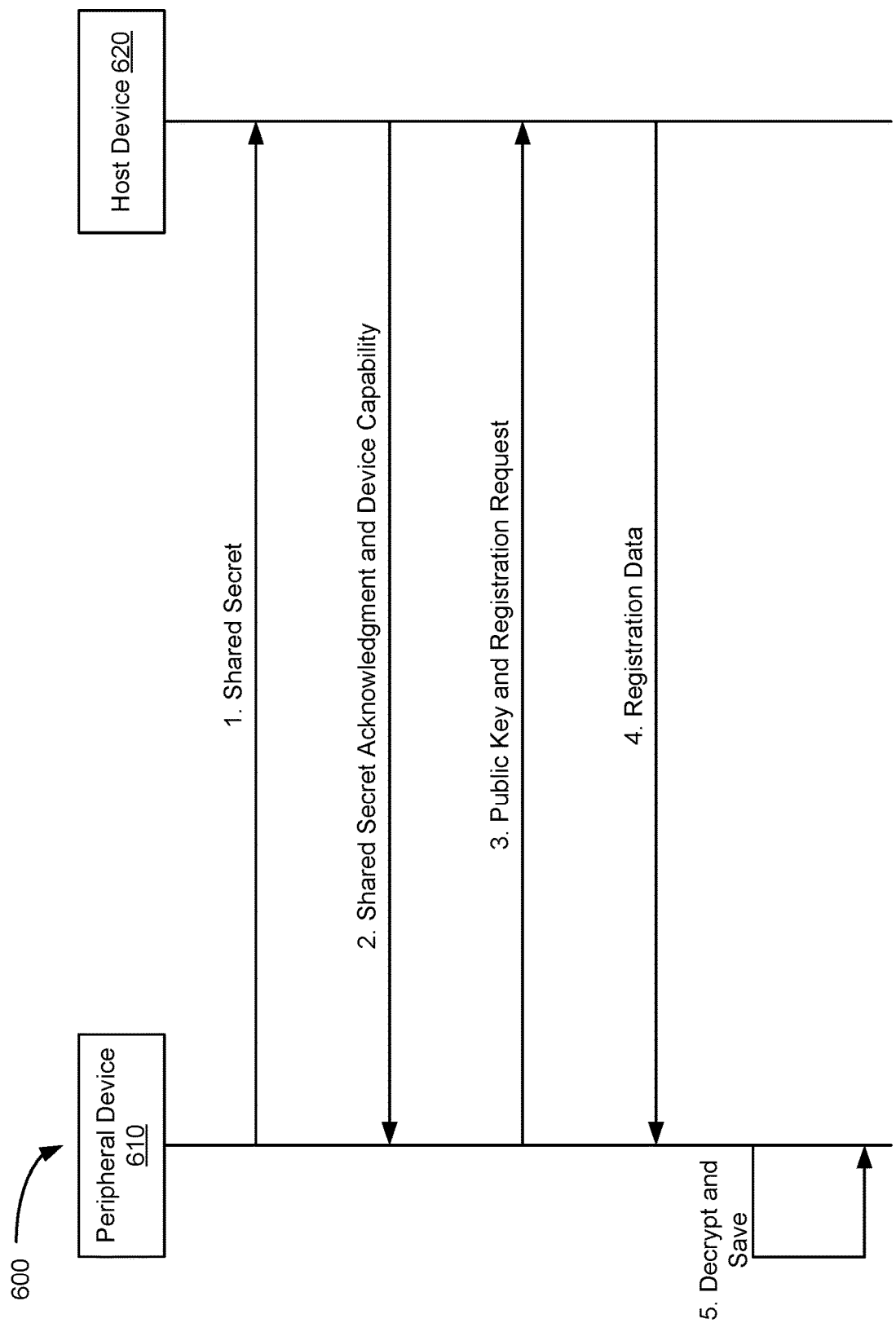
FIG. 6 illustrates an example of a sequence diagram for a registration of a peripheral device to support an authentication-based communication link, in accordance with at least one embodiment.

FIG. 6 illustrates an example of a sequence diagram 600 for a registration of a peripheral device 610 to support an authentication-based communication link, in accordance with at least one embodiment. The peripheral device 610 is an example of any of the peripheral devices 110, 210, 310, 410, or 510. The registration is performed with a host device 620 that executes a peripheral device management application. The host device 620 is an example of any of the host devices 120, 220, or 420 and any of the primary host devices 320 or 520.

In an example, a first step of the sequence diagram 600 includes the peripheral device 610 sending a shared secret to the host device 620 over a Bluetooth link. In an example, the shared secret is sent upon a trigger event. Different trigger events are possible. For instance, the trigger event can be any of a first time the peripheral device 610 boots up, a reset of a previous registration, or a determination by the peripheral device 610 that its list of paired devices is empty. Accordingly, upon completing its Bluetooth pairing with the host device 620, the peripheral device 610 sends the shared secret. The shared secret can be a code, such as a random number, stored in a memory (e.g., a secure memory of the peripheral device), or a hash of such a code.

In an second step, the host device 620 responds, over the Bluetooth link, with a shared secret acknowledgement and a description of the host device's 620 capability to support authentication. The shared secret acknowledgement corresponds to a binding of the peripheral device 610 and the host device 620. The description informs the peripheral device about whether the host device can support a PIN, a password, a GUI pattern, a fingerprint, facial data, or any other authentication means and the priority of using such authentication means. In an example, the peripheral management device receives and compares a second shared secret to the received shared secret. If the two match, the shared secret acknowledgement is sent, along with the device capability description. Different techniques are possible to receive the second shared secret. For instance, the second shared secret is input by a user at a user interface and corresponds to code, or a hash, printed on a label packaged with the peripheral device 610 or attached to the peripheral device 610. In another illustration, the second shared secret is received based on a scan or an image of the label. The scan or image generated by an optical sensor of the host device 620 and processed by the peripheral device management application (e.g., by using optical character recognition—OCR) to derive the second shared secret.

Although the shared secret and the shared secret acknowledgement are described as being sent from the peripheral device 610 and the host device 620, respectively, an opposite data flow is possible. For instance, upon the trigger event, the peripheral device 610 requests and receives the shared secret from the host device 620, compares it to a copy stored in the peripheral device's 610 memory, and sends back the shared secret acknowledgement.

In a third step, the peripheral device 610 sends, in response to at least the shared secret acknowledgement and over the Bluetooth link, a public key of the peripheral device 610 and a registration request. The public key may be pre-stored in the memory of the peripheral device 610, along with a corresponding private key. The registration request requests the host device 620 to send registration data including authentication data and user setting data.

In a fourth step, the host device 620 responds, over the Bluetooth link, to the registration request with the registration data. For example, the peripheral device management application generates the registration data based on user input (e.g., input defining a user credential and one or more user settings) and other data about the user and a number of host devices and already available to the peripheral device management application (e.g., a user ID corresponding to a user login to the peripheral device management application or the host device 620, a device ID of the host device 620, etc.). The peripheral device management application further encrypts the registration data with the public key. Once encrypted, the host device 620 sends the registration data (e.g., encrypted registration data) to the peripheral device 610.

In a fifth step, the peripheral device 610 decrypts and saves the registration data. In particular, upon receiving the registration data, the peripheral device 610 decrypts by using the private key and stores the registration data as decrypted (e.g., decrypted registration data) in the memory of the peripheral device 610.

Figure 7:
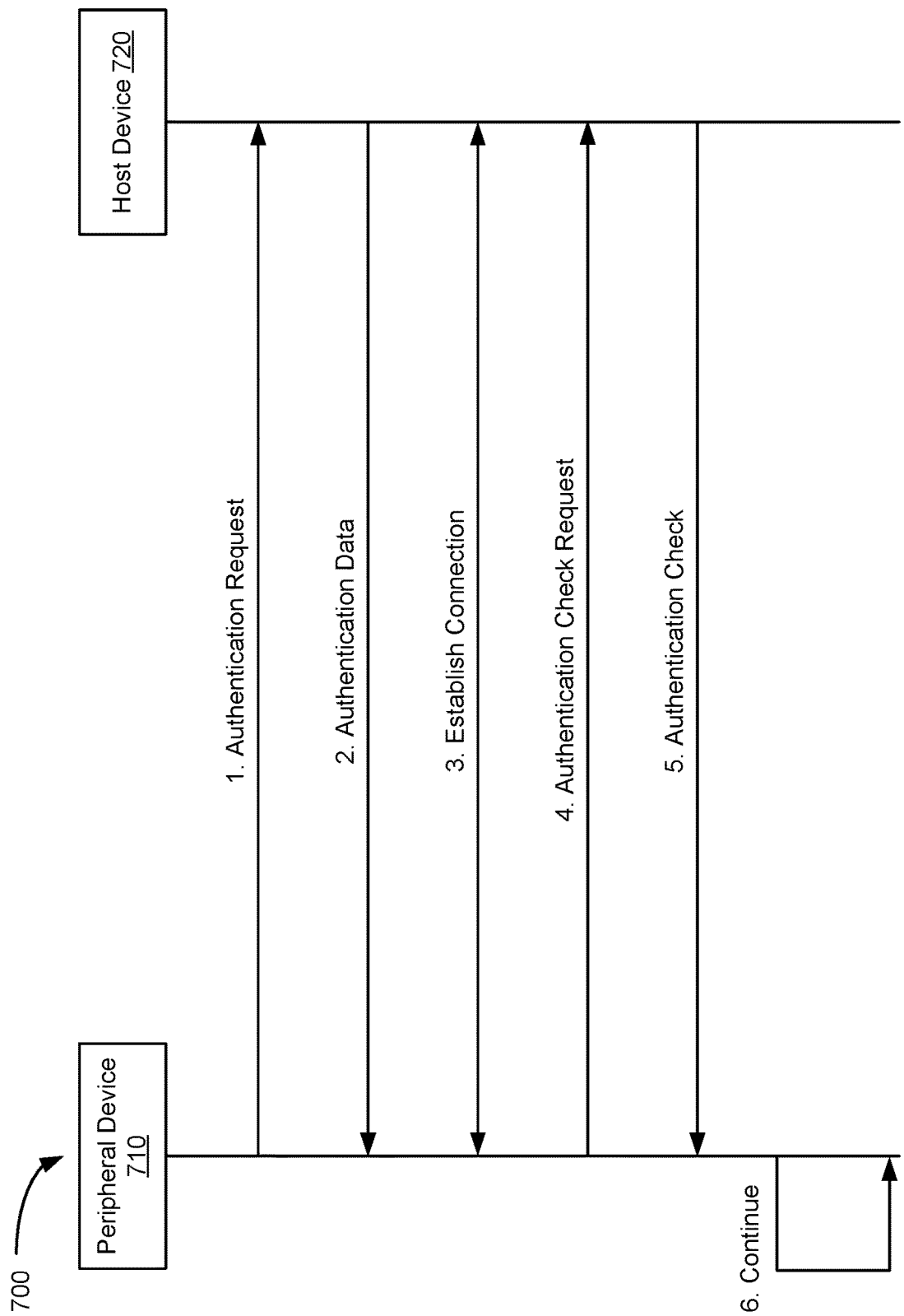
FIG. 7 illustrates an example of a sequence diagram for an authentication by a peripheral device, in accordance with at least one embodiment.

FIG. 7 illustrates an example of a sequence diagram 700 for an authentication by a peripheral device 710, in accordance with at least one embodiment. The peripheral device 710 can be the same as the peripheral device 610 that completed a registration. The authentication is performed upon an attempt for pairing the peripheral device with a host device 720. The host device 720 can be the same as the host device 620 (e.g., is a primary host device) or can be a different host device (e.g., a secondary host device) identified in the registration data.

In an example, a first step of the sequence diagram 700 includes the peripheral device 710 sending an authentication request to the host device 720. For instance, the peripheral device 710 receives a pairing request from the host device 720 (e.g., in a Bluetooth probe over a broadcast link). The peripheral device 710 determines a device ID of the host device 720 from the probe request and looks up the registration data using the device ID. Based on the look-up, the peripheral device 710 determines that the host device 720 is authorized to pair with the peripheral device 710, the authentication capability of the host device 720 and/or the type of user credential stored in the memory of the peripheral device 710, and determines a user setting controlling the use of the user credential (e.g., whether one is needed or whether a user ID and/or the device ID may be sufficient). If a user credential of a particular type is required, the authentication request requests the particular type. If a user ID is sufficient, the authentication request requests the user ID. If a device ID is sufficient, the peripheral device 710 has already received it and the first and second steps of the sequence diagram 700 can be skipped. The authentication request can be sent in a Bluetooth probe response.

In a second step, the host device 720 sends the requested authentication data (e.g., whether the user credential of the particular type or the user ID). The authentication data can be send in another Bluetooth frame, such as in another Bluetooth probe request. The authentication data can be encrypted with the public key of the peripheral device 710.

In a third step, the peripheral device 710 and the host device 720 complete the Bluetooth pairing and establish a Bluetooth link (e.g., a Bluetooth eCSO link, a Bluetooth ACL link, etc.). For instance, the peripheral device 710 decrypts, as applicable, the authentication data with the private key and compares the authentication data as decrypted (e.g., decrypted authentication data) to the stored registration data (e.g., the received user credential to the stored user credential, the received user ID to the stored user ID, etc.). Upon determining a match between the authentication data and the registration data, the peripheral device 710 proceeds to complete operations of the pairing procedure to establish the Bluetooth link.

In a fourth step, the peripheral device 710 sends an authentication check request to the host device while the Bluetooth link is still established. For instance, the authentication check request is sent over the Bluetooth link at time intervals to check that the authentication remains valid. The time intervals can be defined in the user setting. The authentication check request can request a manual check (e.g., input of the user of the host device 720 at a user interface of the peripheral device management application) or an automated check (e.g., run as a background process of the peripheral device management application). Here also, the user setting can indicate whether the manual check or the automated check should be performed. The manual check can request the user to re-enter the user credential. The automated check can request a confirmation of the peripheral device management application that the same user is still logged in to the peripheral device management application or the host device 720 (e.g., the user ID did not change) or that the configuration of the host device 720 has not changed (e.g., the digital certificate of the host device 720 has not changed).

In a fifth step, the host device 720 responds, over the Bluetooth link, with an authentication check. For instance, the peripheral device management application performs the manual check or the automated check. The manual check includes requesting and receiving the user credential and sending this user credential in the authentication check to the peripheral device 710. The automated check includes generating and sending the confirmation in the authentication check to the peripheral device 710.

In a sixth step, the peripheral device 710 continues maintaining the Bluetooth link with the host device 710. For instance, upon receiving the user credential, the peripheral device 710 decrypts, as applicable, and compares it to the registration data. If a match is found, the Bluetooth link is maintained. Otherwise, the Bluetooth link is terminated. Similarly, if the confirmation is received, the Bluetooth link is maintained and, otherwise, it is terminated. The Bluetooth link can also be terminated if no authentication check is received in response to the authentication check request.

Figure 8:
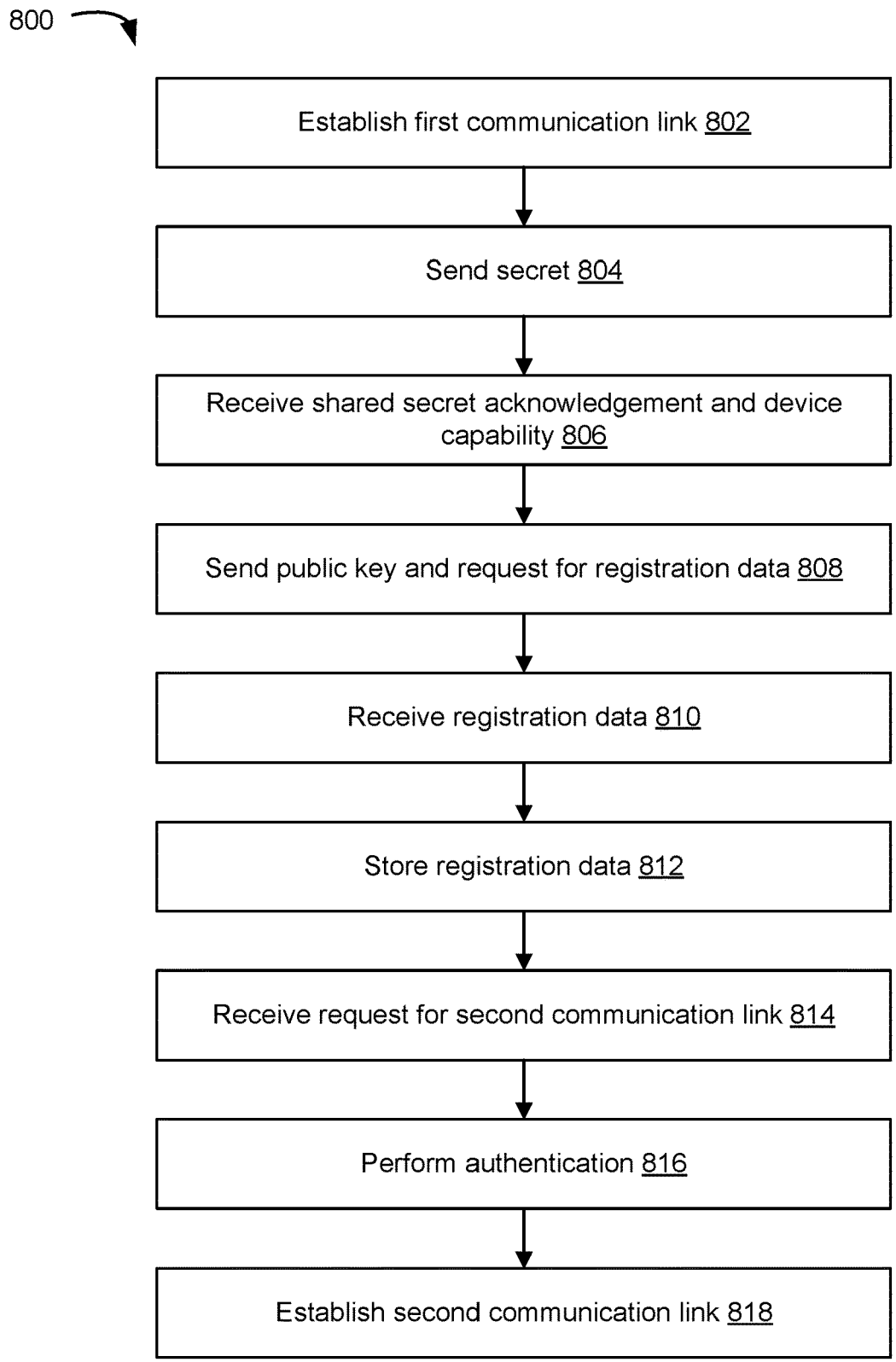
FIG. 8 illustrates an example of a flow for performing a registration of a peripheral device, in accordance with at least one embodiment.
Figure 9:
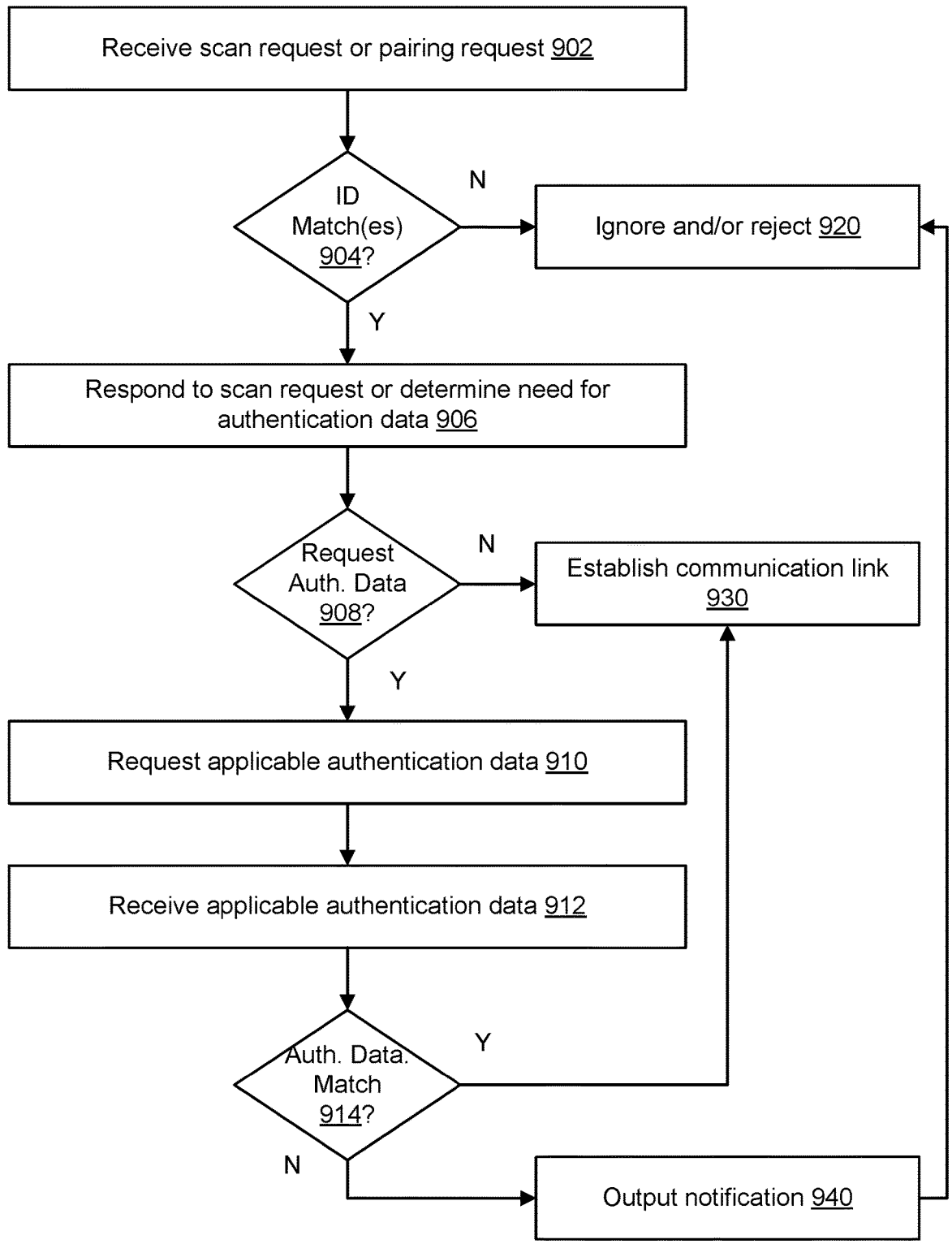
FIG. 9 illustrates an example of a flow for performing an authentication by a peripheral device, in accordance with at least one embodiment.
Figure 10:
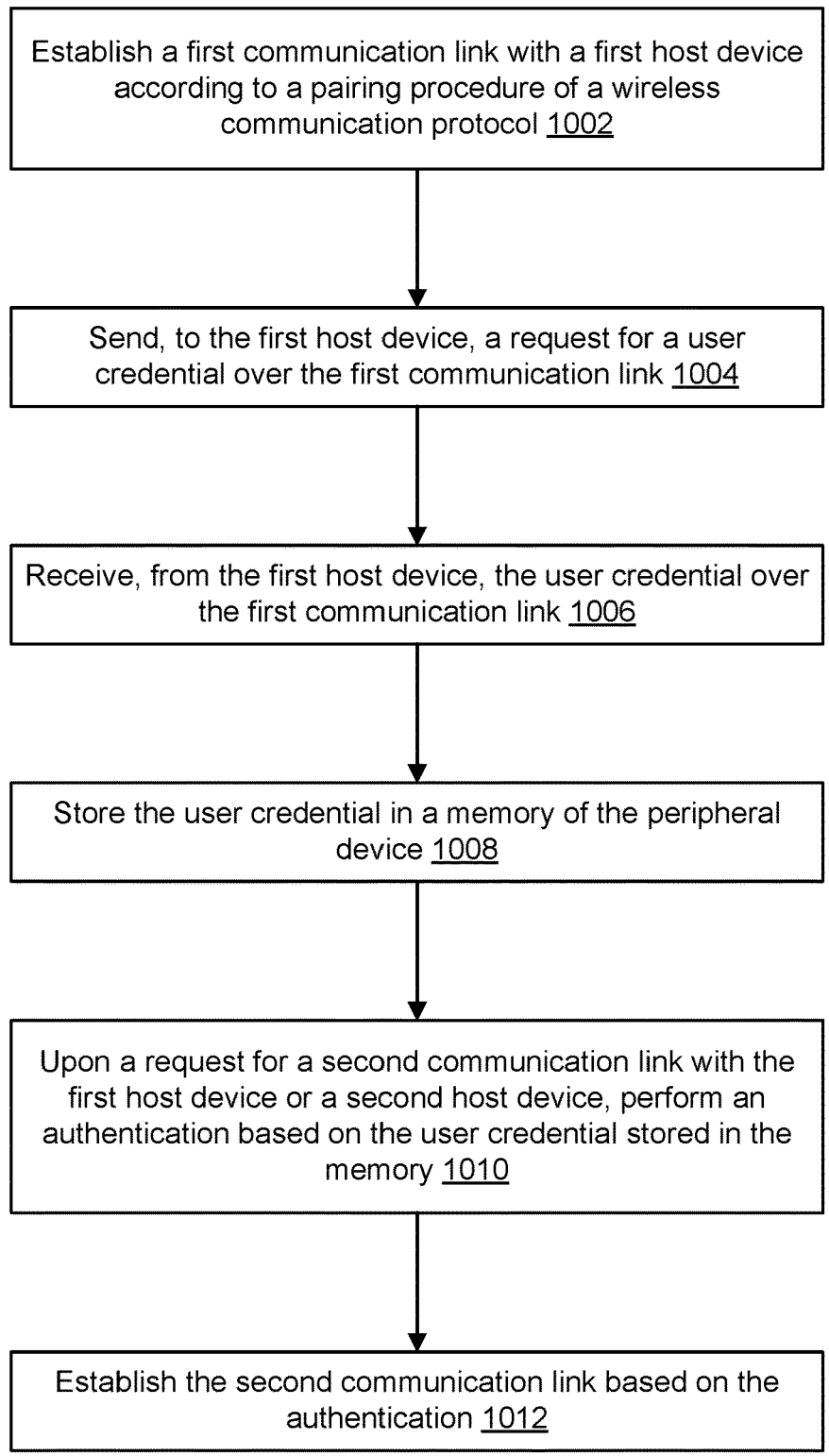
FIG. 10 illustrates an example of a flow for connecting a peripheral device to a host device, in accordance with at least one embodiment.

FIGS. 8-10 show illustrative flows related to establishing a communication link, like a Bluetooth link, between a peripheral device and a host device, in accordance with various embodiments. Some or all of instructions for performing the operations of the illustrative flows can be implemented as hardware circuitry and/or stored as computer-readable instructions on a non-transitory computer-readable medium of the peripheral device, such as any of the peripheral devices described herein above in connection with FIGS. 1-7. As implemented, the instructions represent modules that include circuitry or code executable by a processor(s) of the peripheral device. The use of such instructions configures the peripheral to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 8 illustrates an example of a flow 800 for performing a registration of the peripheral device, in accordance with at least one embodiment. As illustrated, the flow 800 starts at operation 802, where the peripheral device establishes a first communication link with a host device (e.g., a primary host device). In an example, the peripheral device determines a trigger event indicating a first boot up, a previous reset, or an empty list of paired devices and performs Bluetooth pairing operations to pair with the host device and establishes a first Bluetooth link.

At operation 804, the peripheral device sends a shared secret to the host device. In an example, the peripheral device sends, over the first communication link (e.g., the first Bluetooth link), a code or a hash of a code stored in a memory of the peripheral device.

At operation 806, the peripheral device receives a shared secret acknowledgement and data describing the host device's capability to support authentication. In an example, the shared secret acknowledgment and the data are received over the first communication link in response to a binding of the peripheral device and the host device based on the shared secret.

At operation 808, the peripheral device sends a public key of the peripheral device and a request for registration data to the host device. In an example, the public key and the request are sent over the first communication link. The request can request authentication data including one or more user credentials depending on the host device's capability, one or more user IDs, and/or one or more device IDs. The request can also request user setting data specifying how the authentication data is to be used.

At operation 810, the peripheral device receives the registration data from the host device. In an example, at least a portion of the registration data (e.g., the authentication data) is encrypted with the public key and the registration data is received over the first communication link.

At operation 812, the peripheral device stores the registration data in a memory of the peripheral device. In an example, the registration data is decrypted, as applicable, with a private key of the peripheral device and stored in a replay protected memory block, an EEPROM fuse, or a secure file system of the memory.

At operation 814, the peripheral device receives a request for a second communication link. In an example, this request corresponds to a second pairing of the peripheral device with the same host device or a second host device. In this example, the first communication link may have been terminated after operation 812.

At operation 816, the peripheral device performs an authentication based on the authentication data, including any user credential, stored in the memory. The authentication is performed according to a user setting specifying how the authentication is to be used, as further described in FIG. 9.

At operation 818, the peripheral device establishes the second communication link with the host device or the second host device, as applicable. In an example, upon completing the authentication, the peripheral device performs operations of the pairing procedure to establish the second communication link.

FIG. 9 illustrates an example of a flow 900 for performing the authentication by the peripheral device, in accordance with at least one embodiment. Here, the host device can be a primary host device (e.g., one executing a peripheral device management application) or a secondary host device.

As illustrated, the flow starts at operation 902, where the peripheral device receives a scan request or a pairing request of the host device. In an example, the scan request corresponds to identifying peripheral devices in proximity of the host device for pairing. The user setting in the registration data can control whether the peripheral device should be made visible in response to such a scan request and, if so, whether this visibility should be restricted to particular device IDs or user IDs. In comparison, the pairing request corresponds to a request to establish a communication link (e.g., the second communication link as described in the flow 800).

At operation 904, the peripheral device determines whether one or more ID matches exist. If so, operation 906 follows operation 904. Otherwise, operation 920 follows operation 904. In an example, depending on the user setting, the peripheral device determines the device ID of the host device and/or user ID from the scan request or the pairing request. If the user ID is required for the pairing request and is not received, the peripheral device can request it from the host device. Also as specified in the user setting, the peripheral device determines whether the device ID matches a device ID stored as part of the registration data and/or whether the user ID matches a user ID stored as part of the registration data. When the user setting requires a device ID match and user ID match, operation 906 follows operation 904 only when both matches are determined. When the user setting indicates that one match is sufficient, operation 906 follows operation 904 only when at least one of the matches is determined. In other situations, operation 920 follows operation 904.

At operation 906, the peripheral device has determined that the sufficient ID match(es) exists. In the case of a scan request, the peripheral device responds with a device ID of the peripheral device. In this way, the host device can detect the proximity of the peripheral device and identify it to a user via a user interface. In the case of a pairing request, the peripheral determines a need for authentication data. In particular, the user setting can indicate whether a user credential is required, whether a user ID is required, whether a device ID is required, and/or whether an authentication check is required. Given the pairing history of the peripheral device with the host device in association with the device ID and/or the user ID, the peripheral device determines the applicable requirement and proceeds to operation 908.

At operation 908, the peripheral device determines the authentication data required and whether this authentication should be requested or has already been received. In an example, if the user credential is required, the peripheral device can request it at the next operation 910. If the user ID is required and was already determined under operation 904, the peripheral device need not request it again at operation 910. Otherwise the user ID is requested at operation 910. Similarly, if the device ID is required and was already determined under operation 904, the peripheral device need not request it again at operation 910. Otherwise the device ID is requested at operation 910. If the authentication check is required instead of any of the user credential, user ID, or device ID, the peripheral device can request it at operation 910. If the needed authentication data has already been determined and need not be requested again, operation 930 follows operation 908.

At operation 910, the peripheral device requests the applicable authentication data from the host device. In an example, this authentication data includes any of the user credential, user ID, device ID, or authentication check determined at operation 906 to be needed and determined at operation 908 as not being available or not already received.

At operation 912, the peripheral device receives the applicable authentication data from the host device. In an example, if a user credential is requested at operation 910, the peripheral device receives the user credential. Similarly, if any of a user ID, a device ID, or an authentication check is requested, the peripheral device receives the user ID, the device ID, or the authentication check. If any of such authentication data is encrypted with a public key of the peripheral device, the encrypted authentication data is decrypted with a corresponding private key.

At operation 914, the peripheral device determines whether a match exists between the authentication data and the registration data. If the match exists, operation 930 follows operation 914. Otherwise, operation 940 follows operation 914. In an example, if a user credential is received at operation 912, the peripheral device compares the received user credential to the user credential stored as part of the registration information to determine whether the match exists or not. Similarly, if a user ID is received at operation 912, the peripheral device compares the received user ID to the user ID stored as part of the registration information to determine whether the match exists or not. Also, if a device ID is received at operation 912, the peripheral device compares the received device ID to the device ID stored as part of the registration information to determine whether the match exists or not. In comparison, if an authentication check is received, the peripheral device proceeds to operation 930.

At operation 920, the peripheral device has already determined that the peripheral device should not be made visible in response to the scan request or that the pairing should not be performed. In the case of the scan request, the peripheral device ignores the scan request and does not respond thereto. In the case of the pairing request, the peripheral device rejects the pairing request and does not complete the pairing procedure and, thus, does not establish the communication link.

At operation 930, the peripheral device has already determined that the communication link can be established. Accordingly, the peripheral device completes the pairing procedure and establishes the communication link.

At operation 940, the peripheral device has determined an authentication failure. Accordingly, the peripheral device can output a notification identifying an authorized user of the peripheral device. Operation 940 can be optional and can be followed by operation 920 or operation 920 can immediately follow operation 914 instead to reject the request to establish the communication link.

FIG. 10 illustrates an example of a flow 1000 for connecting the peripheral device to the host device, in accordance with at least one embodiment. Operations of the flow 1000 can be implemented by using some or all of the operations of the flow 800 and/or the flow 900 as sub-operations of the flow 1000.

As illustrated, the flow starts at operation 1002, where the peripheral device establishes a first communication link with a first host device according to a pairing procedure of a wireless communication protocol. Sub-operations of operation 1002 can include operation 802. Means for performing the functionality at operation 1002 may comprise software and/or hardware components of the peripheral device, such as the processor 1102, the secure memory 1104, the storage device 1106, the I/O peripherals 1108, the communication peripherals 1110, the interface bus 1112, and/or other components of the computing device 1100 illustrated in FIG. 11 and described in more detail below.

At operation 1004, the peripheral device sends, to the first host device, a request for a user credential over the first communication link. Sub-operations of operation 1004 can include any or all of operations 804-808. Means for performing the functionality at operation 1004 may comprise software and/or hardware components of the peripheral device, such as the processor 1102, the secure memory 1104, the storage device 1106, the I/O peripherals 1108, the communication peripherals 1110, the interface bus 1112, and/or other components of the computing device 1100 illustrated in FIG. 11 and described in more detail below.

At operation 1006, the peripheral device receives, from the first host device, the user credential over the first communication link. Sub-operations of operation 1006 can include operation 810. Means for performing the functionality at operation 1006 may comprise software and/or hardware components of the peripheral device, such as the processor 1102, the secure memory 1104, the storage device 1106, the I/O peripherals 1108, the communication peripherals 1110, the interface bus 1112, and/or other components of the computing device 1100 illustrated in FIG. 11 and described in more detail below.

At operation 1008, the peripheral device stores the user credential in a memory of the peripheral device. Sub-operations of operation 1008 can include operation 812. Means for performing the functionality at operation 1008 may comprise software and/or hardware components of the peripheral device, such as the processor 1102, the secure memory 1104, the storage device 1106, the I/O peripherals 1108, the communication peripherals 1110, the interface bus 1112, and/or other components of the computing device 1100 illustrated in FIG. 11 and described in more detail below.

At operation 1010, upon a request for a second communication link with the first host device or a second host device, the peripheral device performs an authentication based on the user credential stored in the memory. Sub-operations of operation 1010 can include any or all of operations 814-816 and 902-930. Means for performing the functionality at operation 1010 may comprise software and/or hardware components of the peripheral device, such as the processor 1102, the secure memory 1104, the storage device 1106, the I/O peripherals 1108, the communication peripherals 1110, the interface bus 1112, and/or other components of the computing device 1100 illustrated in FIG. 11 and described in more detail below.

At operation 1012, the peripheral device establishes the second communication link based on the authentication. Sub-operations of operation 1012 can include operation 818. Means for performing the functionality at operation 1012 may comprise software and/or hardware components of the peripheral device, such as the processor 1102, the secure memory 1104, the storage device 1106, the I/O peripherals 1108, the communication peripherals 1110, the interface bus 1112, and/or other components of the computing device 1100 illustrated in FIG. 11 and described in more detail below.

Figure 11:
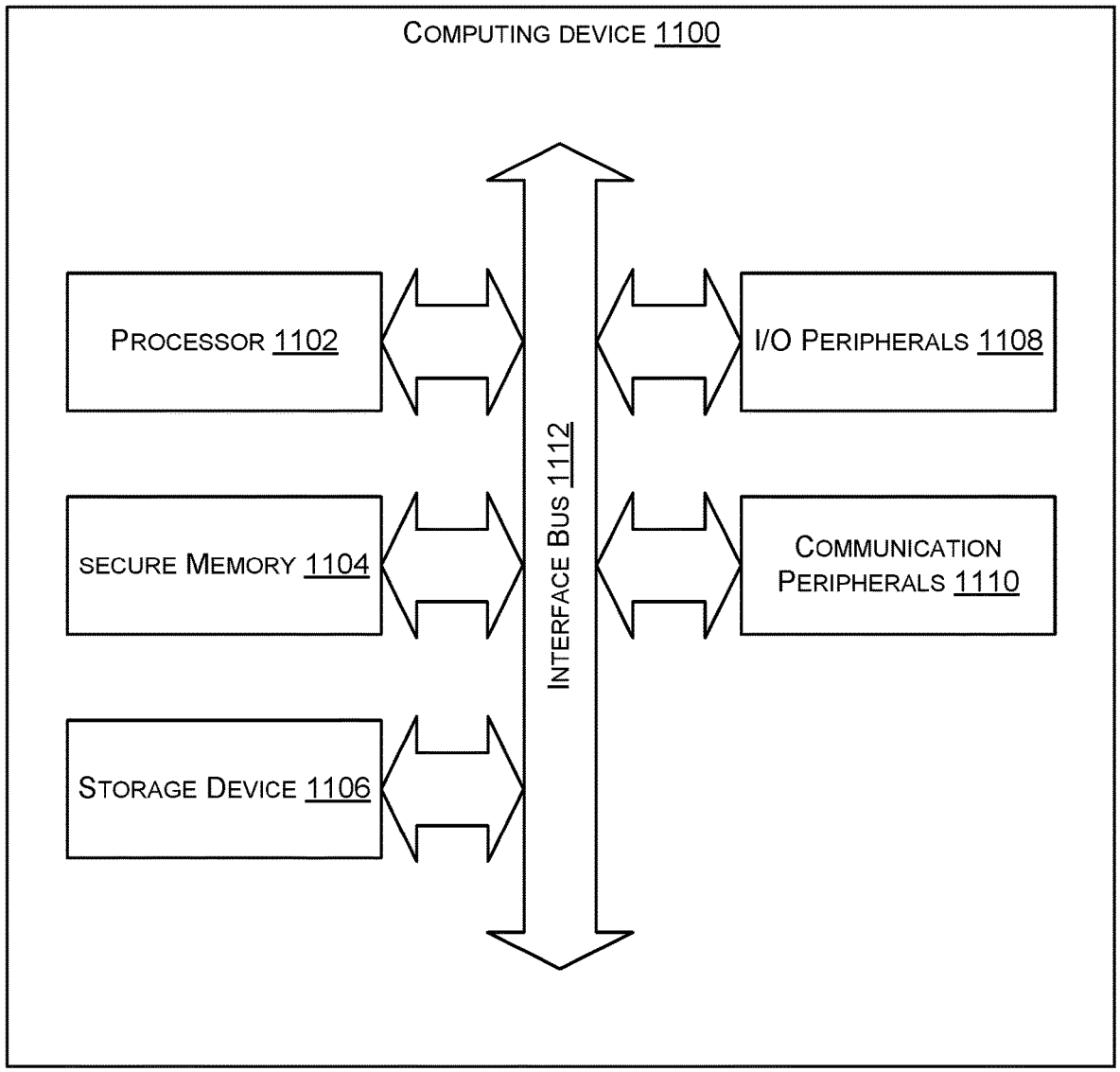
FIG. 11 illustrates an example of an architecture of a computing device that includes, according to embodiments of the present disclosure.

FIG. 11 illustrates an example of an architecture of a computing device 1100, according to embodiments of the present disclosure. The computing device 1100 is an example of the peripheral device 110 of FIG. 1.

The computing device 1100 includes at least a processor 1102, a memory 1104, a storage device 1106, input/output peripherals (I/O) 1108, communication peripherals 1110, and an interface bus 1112. The interface bus 1112 is configured to communicate, transmit, and transfer data, controls, and commands among the various components of the computing device 1100. Any of the memory 1104 or the storage device 1106 can include a secure architecture (e.g., a replay protected memory block, an EEPROM fuse, or a secure file system on a non-volatile memory portion) that stores authentication data, registration data, a shared secret, and/or a pair of asymmetric encryption keys. The memory 1104 and the storage device 1106 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1104 and the storage device 1106 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing device 1100.

Further, the memory 1104 includes an operating system, programs, and applications. The processor 1102 is configured to execute the stored instructions and includes, for example, a logical processing unit, a microprocessor, a digital signal processor, and other processors. The memory 1104 and/or the processor 1102 can be virtualized and can be hosted within another computing device of, for example, a cloud network or a data center. The I/O peripherals 1108 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1108 are connected to the processor 1102 through any of the ports coupled to the interface bus 1112. The communication peripherals 1110 are configured to facilitate communication between the computing device 1100 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method implemented by a peripheral device, the method comprising:
    establishing a first communication link with a first host device according to a pairing procedure of a wireless communication protocol;
    sending, to the first host device, a secret over the first communication link;
    receiving, from the first host device and over the first communication link, an acknowledgement that the secret is verified;
    sending, to the first host device and in response to the acknowledgement, a request for a user credential over the first communication link;
    receiving, from the first host device, the user credential over the first communication link;
    storing the user credential in a memory of the peripheral device;
    upon a request for a second communication link with the first host device or a second host device, performing an authentication based on the user credential stored in the memory; and
    establishing the second communication link based on the authentication.

2. The method of claim 1, further comprising:
    receiving, from the first host device and over the first communication link, data indicating a capability of the first host device to support the authentication, wherein the user credential is requested according to the capability of the first host device.

3. The method of claim 1, further comprising:
    sending, to the first host device and over the first communication link, a public key of the peripheral device in response to the acknowledgement, wherein the user credential is encrypted by the first host device with the public key; and
    decrypting the user credential with a private key of the peripheral device, wherein the user credential is stored in the memory after being decrypted.

4. The method of claim 1, wherein performing the authentication comprises:
    determining, prior to establishing the second communication link with the first host device, that the authentication was not previously performed in association with the first host device;

sending an authentication request to the first host device;
receiving, from the first host device, a second user credential in response to the authentication request; and
determining a match between the second user credential and the user credential stored in the memory, wherein the second communication link is established with the first host device based on the match.

5. The method of claim 4, further comprising:
storing, in the memory, data indicating the match;
upon receiving a request for a third communication link with the first host device and based on the data, determining that the authentication was previously performed in association with the first host device; and
establishing the third communication link without re-performing the authentication.

6. The method of claim 1, further comprising:
while the second communication link is established with the first host device, sending a request for an authentication check to a background process of the first host device;
receiving the authentication check; and
maintaining the second communication link based on the authentication check.

7. The method of claim 1, further comprising:
receiving, from the first host device and over the first communication link, a first identifier of the first host device and a second identifier of the second host device;
storing, in the memory, the first identifier and the second identifier;
upon a scan from a host device to establish the second communication link according to the pairing procedure, determining whether a match exists between a device identifier of the host device and at least one of the first identifier or the second identifier stored in the memory; and
responding to the scan with an identifier of the peripheral device upon determining that the match exists; or
ignoring the scan upon determining that the match does not exist.

8. The method of claim 1, further comprising:
receiving, from the first host device and over the first communication link, a first identifier of the first host device and a second identifier of the second host device;
storing, in the memory, the first identifier and the second identifier;
receiving, from the second host device, a request for the second communication link and a device identifier; and
determining a match between the device identifier and the second identifier, wherein the second communication link is established based on the match.

9. The method of claim 8, further comprising:
receiving, from a third host device, a request for a third communication link with the third host device;
determining that a device identifier of the third host device does not match any of the first identifier or the second identifier; and
rejecting the request for the third communication link.

10. The method of claim 1, further comprising:
receiving, from the first host device and over the first communication link, device identifiers corresponding to host devices authorized to connect with the peripheral device and a user identifier corresponding to a user authorized to use the peripheral device;
storing, in the memory, the device identifiers and the user identifier;
receiving, from a third host device, a request for a third communication link;
determining that a device identifier of the third host device does not match any of the device identifiers; and
outputting a notification indicating the user identifier.

11. A peripheral device comprising:
one or more processors; and
one or more memories storing computer-readable instructions that, upon execution by at least one of the one or more processors, configure the peripheral device to:
establish a first communication link with a first host device according to a pairing procedure of a wireless communication protocol;
send, to the first host device, a secret over the first communication link;
receive, from the first host device and over the first communication link, an acknowledgement that the secret is verified;
send, to the first host device and in response to the acknowledgement, a request for a user credential over the first communication link;
receive, from the first host device, the user credential over the first communication link;
store the user credential in at least one of the one or more memories of the peripheral device;
upon a request for a second communication link with the first host device or a second host device, perform an authentication based on the user credential; and
establish the second communication link based on the authentication.

12. The peripheral device of claim 11, wherein the execution of the computer-readable instructions further configures the peripheral device to:
receive, from the first host device and over the first communication link, a first identifier of the first host device and a second identifier of the second host device;
store, in the at least one of the one or more memories, the first identifier and the second identifier;
receive, from the second host device, a request for the second communication link and a device identifier; and
determine a match between the device identifier and the second identifier, wherein the second communication link is established based on the match.

13. The peripheral device of claim 12, wherein the execution of the computer-readable instructions further configures the peripheral device to:
determine, prior to establishing the second communication link with the second host device, that the authentication was not previously performed in association with the second host device;
send an authentication request to the second host device;
receive, from the second host device, a second user credential in response to the authentication request; and
determine a second match between the second user credential and the user credential, wherein the second communication link is established based on the second match.

14. The peripheral device of claim 13, wherein the execution of the computer-readable instructions further configures the peripheral device to:
store, in the at least one of the one or more memories, data indicating the second match;
upon receiving a request for a third communication link with the second host device and based on the data, determine that the authentication was previously performed in association with the second host device; and establish the third communication link without re-performing the authentication.

15. The peripheral device of claim 12, wherein the execution of the computer-readable instructions further configures the peripheral device to:
receive, from a third host device, a request for a third communication link with the third host device;
determine that a device identifier of the third host device does not match any of the first identifier or the second identifier; and
reject the request for the third communication link.

16. The peripheral device of claim 11, wherein the execution of the computer-readable instructions further configures the peripheral device to:
receive, from the first host device and over the first communication link, device identifiers corresponding to host devices authorized to connect with the peripheral device and a user identifier corresponding to a user authorized to use the peripheral device;
store, in the at least one of the one or more memories, the device identifiers and the user identifier;
receive, from a third host device, a request for a third communication link;
determine that a device identifier of the third host device does not match any of the device identifiers; and
output a notification indicating the user identifier.

17. A peripheral device comprising:
means for establishing a first communication link with a first host device according to a pairing procedure of a wireless communication protocol;
means for sending, to the first host device, a secret over the first communication link;
means for receiving, from the first host device and over the first communication link, an acknowledgement that the secret is verified;
means for sending, to the first host device and in response to the acknowledgement, a request for a user credential over the first communication link;
means for receiving, from the first host device, the user credential over the first communication link;
means for storing the user credential in a memory of the peripheral device;
upon a request for a second communication link with the first host device or a second host device, means for performing an authentication based on the user credential stored in the memory; and
means for establishing the second communication link based on the authentication.

18. The peripheral device of claim 17, further comprising:
means for receiving, from the first host device and over the first communication link, a first user identifier;
means for storing the first user identifier;
means for receiving, from the second host device, a request for the second communication link and a second user identifier; and
means for determining a match between the first user identifier and the second user identifier, wherein the second communication link is established based on the match.

19. The peripheral device of claim 18, wherein the means for performing the authentication comprises:
means for determining prior to establishing the second communication link, that the authentication was not previously performed in association with the first user identifier;
means for sending an authentication request to the second host device;
means for receiving, from the second host device, a second user credential in response to the authentication request; and
means for determining a second match between the second user credential and the user credential, wherein the second communication link is established based on the second match.

20. The peripheral device of claim 19, further comprising:
means for storing data indicating the second match;
upon receiving a request for a third communication link with the second host device in association, means for determining that the request for the third communication link is associated with the first user identifier;
means for determining that the authentication was previously performed in association with the first user identifier; and
means for establishing the third communication link without re-performing the authentication.

21. The peripheral device of claim 17, further comprising:
means for receiving, from the first host device and over the first communication link, device identifiers corresponding to host devices authorized to connect with the peripheral device and user identifiers corresponding to users authorized to use the peripheral device;
means for storing the device identifiers and the user identifiers;
means for receiving, from a host device, a request for a third communication link and a user identifier; and
means for determining whether a first match exists between the device identifier of the host device and the device identifier and whether a second match exists between the user identifier and the user identifiers.

22. The peripheral device of claim 21, further comprising:
upon determining that the first match exists and the second match exists, means for determining that the authentication was previously performed in association with the device identifier and the user identifier; and
means for establishing the third communication link without re-performing the authentication.

23. A non-transitory computer-readable storage medium storing instructions that, upon execution by a peripheral device, cause the peripheral device to perform operations comprising:
establishing a first communication link with a first host device according to a pairing procedure of a wireless communication protocol;
send, to the first host device, a secret over the first communication link;
receive, from the first host device and over the first communication link, an acknowledgement that the secret is verified;
sending, to the first host device and in response to the acknowledgement, a request for a user credential over the first communication link;
receiving, from the first host device, the user credential over the first communication link;
storing the user credential in a memory of the peripheral device;
upon a request for a second communication link with the first host device or a second host device, performing an authentication based on the user credential stored in the memory; and
establishing the second communication link based on the authentication.

24. The non-transitory computer-readable storage medium of claim 23, wherein the operations further comprise:

receiving, from the first host device and over the first communication link, data indicating a capability of the first host device to support the authentication, wherein the user credential is requested according to the capability of the first host device.

25. The non-transitory computer-readable storage medium of claim 23, wherein the operations further comprise:
sending, to the first host device and over the first communication link, a public key of the peripheral device in response to the acknowledgement, wherein the user credential is encrypted by the first host device with the public key; and
decrypting the user credential with a private key of the peripheral device, wherein the user credential is stored in the memory after being decrypted.

26. The non-transitory computer-readable storage medium of claim 23, wherein performing the authentication comprises:
determining, prior to establishing the second communication link with the first host device, that the authentication was not previously performed in association with the first host device;
sending an authentication request to the first host device;
receiving, from the first host device, a second user credential in response to the authentication request; and
determining a match between the second user credential and the user credential stored in the memory, wherein the second communication link is established with the first host device based on the match.

27. The non-transitory computer-readable storage medium of claim 26, wherein the operations further comprise:
storing, in the memory, data indicating the match;
upon receiving a request for a third communication link with the first host device and based on the data, determining that the authentication was previously performed in association with the first host device; and
establishing the third communication link without re-performing the authentication.

28. The non-transitory computer-readable storage medium of claim 23, wherein the operations further comprise:
while the second communication link is established with the first host device, sending a request for an authentication check to a background process of the first host device;
receiving the authentication check; and
maintaining the second communication link based on the authentication check.

* * * * *